US012774166B2

(12) United States Patent
Vorbohle et al.

(10) Patent No.: US 12,774,166 B2
(45) Date of Patent: Oct. 27, 2026

(54) ENERGY TRANSMISSION IN A LINEAR TRANSPORT SYSTEM

(71) Applicant: Beckhoff Automation GmbH, Verl (DE)

(72) Inventors: Thomas Vorbohle, Rietberg (DE); Jan Achterberg, Duisburg (DE); Andreas Brinker, Bakum (DE)

(73) Assignee: Beckhoff Automation GmbH, Verl (DE)

( * ) Notice: Subject to any disclaimer, the term of this patent is extended or adjusted under 35 U.S.C. 154(b) by 145 days.

(21) Appl. No.: 18/603,832

(22) Filed: Mar. 13, 2024

(65) Prior Publication Data

US 2024/0217749 A1 Jul. 4, 2024

Related U.S. Application Data

(63) Continuation of application No. PCT/EP2022/075789, filed on Sep. 16, 2022.

(30) Foreign Application Priority Data

Sep. 17, 2021 (DE) ..................... 10 2021 124 123.5

(51) Int. Cl.

| | |
|---|---|
| ***B65G 23/23*** | (2006.01) |
| ***H02J 50/10*** | (2016.01) |
| ***H02P 6/00*** | (2016.01) |

(52) U.S. Cl.

CPC .............. *B65G 23/23* (2013.01); *H02J 50/10* (2016.02); *H02P 6/006* (2013.01); *B65G 2811/091* (2013.01)

(58) Field of Classification Search

CPC .. B65G 23/23; B65G 2811/091; B65G 54/02; H02J 50/10; H02P 6/006; H02P 25/064;

(Continued)

(56) References Cited

U.S. PATENT DOCUMENTS 5,293,308 A 3/1994 Boys et al.
6,499,701 B1 * 12/2002 Thornton ................ B60L 5/005 246/194

(Continued)

FOREIGN PATENT DOCUMENTS

CA 2403762 C 9/2007
DE 10014954 A1 10/2001

(Continued)

OTHER PUBLICATIONS

International Search Report and Written Opinion dated Jan. 20, 2023 in connection with International Patent Application No. PCT/EP2022/075789, 30 pages including English translation.

(Continued)

*Primary Examiner* — Gene O Crawford
*Assistant Examiner* — Abby A Jorgensen
(74) *Attorney, Agent, or Firm* — Dorsey & Whitney LLP

(57) ABSTRACT

A method for transmitting energy from a stationary unit of a linear transport system to a movable unit of the linear transport system. The linear transport system includes a movable unit and at least one further movable unit, a guide rail and a linear motor. The movable units include energy-transmitting coils. The following steps are carried out by a controller: determining that the movable unit requires an amount of energy to carry out an application that cannot be provided via energy transmission between energy-transmitting coils of at least one stationary unit to the at least one energy-receiving coil, and outputting control signals to at least one stationary unit for positioning the further movable unit in a transmission position on the guide rail immediately in front of or behind the movable unit, and for coupling energy-transmitting elements of the further movable unit to energy-transmitting elements of the movable unit.

18 Claims, 15 Drawing Sheets

(58) Field of Classification Search
CPC ....... H02K 41/031; B60L 13/04; B60L 13/10; B60L 13/03
See application file for complete search history.

(56) References Cited

U.S. PATENT DOCUMENTS

| | | | | |
|---|---|---|---|---|
| 7,958,830 | B2 | 6/2011 | Schemm et al. | |
| 10,315,524 | B2 | 6/2019 | Wechsler et al. | |
| 10,449,865 | B2 | 10/2019 | Rumbak | |
| 10,483,895 | B2 | 11/2019 | Sun et al. | |
| 10,608,469 | B2 | 3/2020 | Floresta et al. | |
| 10,723,237 | B2 | 7/2020 | Wechsler et al. | |
| 10,787,093 | B2 | 9/2020 | Wechsler et al. | |
| 11,309,737 | B2 | 4/2022 | Floresta et al. | |
| 11,318,845 | B2 | 5/2022 | Rumbak | |
| 11,329,510 | B2 | 5/2022 | Floresta et al. | |
| 11,715,977 | B2 | 8/2023 | Floresta et al. | |
| 12,040,634 | B2 | 7/2024 | Pruessmeier et al. | |
| 2007/0289476 | A1 | 12/2007 | Schemm et al. | |
| 2013/0328516 | A1* | 12/2013 | Prussmeier | H02K 41/031 324/207.16 |
| 2015/0008768 | A1* | 1/2015 | Achterberg | B65G 54/02 310/12.11 |
| 2016/0352139 | A1 | 12/2016 | Takatsu et al. | |
| 2018/0062535 | A1* | 3/2018 | Kaulmann | H02P 25/06 |
| 2018/0319282 | A1 | 11/2018 | Haenschke et al. | |
| 2019/0068101 | A1 | 2/2019 | Sun et al. | |
| 2019/0140492 | A1 | 5/2019 | Beyer et al. | |
| 2020/0044553 | A1 | 2/2020 | Guo et al. | |
| 2020/0044593 | A1 | 2/2020 | Sun et al. | |
| 2020/0048016 | A1* | 2/2020 | Sinzenich | B65G 45/00 |
| 2020/0195049 | A1 | 6/2020 | Floresta et al. | |
| 2021/0046826 | A1 | 2/2021 | Prüssmeier et al. | |
| 2021/0099119 | A1 | 4/2021 | Sun et al. | |
| 2022/0388401 | A1 | 12/2022 | Prüssmeier et al. | |
| 2024/0217347 | A1 | 7/2024 | Brinker et al. | |
| 2024/0223010 | A1 | 7/2024 | Achterberg et al. | |

FOREIGN PATENT DOCUMENTS

| | | | | |
|---|---|---|---|---|
| DE | 10334737 | A1 | 2/2005 | |
| DE | 102010001484 | A1 | 9/2011 | |
| DE | 102010027640 | A1 | 1/2012 | |
| DE | 102011115092 | A1 | 4/2013 | |
| DE | 102018111715 | A1 * | 11/2019 | B60L 5/005 |
| DE | 102020107782 | A1 | 9/2021 | |
| DE | 102021124121 | A1 | 3/2023 | |
| DE | 102021124122 | A1 | 3/2023 | |
| DE | 102021124123 | A1 | 3/2023 | |
| EP | 0739831 | A2 | 10/1996 | |
| EP | 1083022 | A2 | 3/2001 | |
| EP | 3403867 | A1 * | 11/2018 | B60L 7/10 |
| EP | 3447884 | A1 | 2/2019 | |
| EP | 3462573 | A2 * | 4/2019 | H02P 25/064 |
| GB | 201323160 | | 2/2014 | |
| GB | 2521676 | A | 7/2015 | |
| JP | 2010127465 | A * | 6/2010 | F16C 29/082 |
| KR | 20110032787 | A * | 3/2011 | B60L 13/04 |
| MX | 09201100 | A | 9/1992 | |
| WO | 9217929 | A1 | 10/1992 | |
| WO | 0102211 | A1 | 1/2001 | |
| WO | 0171882 | A1 | 9/2001 | |
| WO | 2005021317 | A1 | 3/2005 | |
| WO | 2015128498 | A1 | 9/2015 | |
| WO | 2017108114 | A1 | 6/2017 | |
| WO | 2018221532 | A1 | 12/2018 | |
| WO | WO-2019219810 | A1 * | 11/2019 | H02J 7/60 |
| WO | WO-2019219834 | A1 * | 11/2019 | B60L 53/305 |
| WO | WO-2020091721 | A1 * | 5/2020 | H01M 50/209 |
| WO | 2021185910 | A1 | 9/2021 | |
| WO | 2023041663 | A1 | 3/2023 | |
| WO | 2023041698 | A1 | 3/2023 | |
| WO | 2023041716 | A1 | 3/2023 | |

OTHER PUBLICATIONS

International Search Report and Written Opinion dated Jan. 23, 2023 in connection with International Patent Application No. PCT/EP2022/075753, 32 pages including English translation.

International Search Report and Written Opinion dated Jan. 26, 2023 in connection with International Patent Application No. PCT/EP2022/075673, 26 pages including English translation.

Translation of "demodulation" from <https://www.itwissen.info/Demodulation-demodulation.htm>, Apr. 12, 2019, 2 pages with English translation.

International Preliminary Report on Patentability dated Aug. 8, 2023 in connection with International Patent Application No. PCT/EP2022/075673, 16 pages including English translation.

Examination Report dated Aug. 19, 2022 in connection with German Patent Application No. 10 2021 124 122.7, 16 pages including English translation.

Examination Report dated Aug. 19, 2022 in connection with German patent application No. 10 2021 124 123.5, 18 pages including English translation.

Examination Report dated Aug. 19, 2022 in connection with German patent application No. 10 2021 124.121.9, 12 pages including English translation.

International Preliminary Report on Patentability dated Sep. 3, 2023 in connection with International Patent Application No. PCT/EP2022/075753, 34 pages including English translation.

International Preliminary Report on Patentability dated Nov. 2, 2023 in connection with International Patent Application No. PCT/EP2022/075789, 16 pages including English translation.

Communication under Article 94(3) EPC dated Oct. 14, 2024 in connection with European patent application No. 22786786.8, 26 pages including English translation.

Office Action dated Dec. 17, 2024 in connection with Chinese patent application No. 202280062764.6, 9 pages including partial English translation.

Notification of an objection dated Sep. 12, 2025 in connection with European patent application No. 22797015.9, 42 pages including English translation.

United States Patent and Trademark Office, "Jul. 2024 Subject Matter Eligibility Examples," at https://www.uspto.gov/sites/default/files/documents/2024-AI-SMEUpdateExamples47-49.pdf (35 pages).

Translation of German patent publication DE10334737A1, 36 pages.

Translation of International Patent Publication No. WO2005021317A1, 19 pages.

* cited by examiner

ENERGY TRANSMISSION IN A LINEAR TRANSPORT SYSTEM

CROSS-REFERENCE TO RELATED APPLICATIONS

This patent application is a continuation of International Patent Application No. PCT/EP2022/075789 filed Sep. 16, 2022, "Energy Transmission in a Linear Transport System," which claims the priority of the German patent application DE 10 2021 124 123.5 filed Sep. 17, 2021, "Energieübertragung in einem linearen Transportsystem," each of which is incorporated by reference herein, in the entirety and for all purposes.

FIELD

This application relates to an energy transmission in a linear transport system. In particular, the application comprises a method for transmitting energy in a linear transport system, a controller and a computer program for executing the method, a machine-readable storage medium with a computer program, a stationary unit of a linear transport system and the linear transport system.

BACKGROUND

Linear transport systems are known from the state of the art in which a movable unit may be moved along a guide rail and which comprise a linear motor for driving the movable unit, wherein the linear motor comprises a stator and a rotor. The stator may comprise at least a motor module comprising one or a plurality of drive coils arranged stationary along the guide rail, while the movable unit is arranged on the carriage and may have one or a plurality of magnets. By energizing the drive coils, a force may be generated on the magnets of the movable unit in such a way that the movable unit moves along the guide rail.

It may also be provided that the movable unit or the carriage comprises a tool or an application, where energy must be transmitted from the stationary unit to the movable unit in order to operate the tool or the application and data may be transmitted both from the stationary unit to the movable unit and from the movable unit to the stationary unit. The German patent application DE 10 2018 111 715 A1 dated 16 May 2018 discloses such a linear transport system with an energy transmission between a stationary coil module, i.e. a stationary unit, and a movable carriage, i.e. a movable unit. Energy-transmitting coils and energy-receiving coils for energy transmission and first data coils or second data coils for data transmission are provided for this purpose.

SUMMARY

An improved method for transmitting energy from a stationary unit to a movable unit of a linear transport system, an improved control device with the aid of which the implementation of the method may be controlled, an improved computer program for implementing the method and a machine-readable storage medium for the computer program and an improved movable unit of a linear transport system which is embodied to take over the energy transmission according to the method according to the application, as well as the provision of a linear transport system in which such an energy transmission is possible, are provided.

EXAMPLES

According to an aspect, a method for transmitting energy from a stationary unit of a linear transport system to a movable unit of the linear transport system is provided, wherein the linear transport system comprises a movable unit and at least one further movable unit, a guide rail for guiding the movable units, a plurality of stationary units and a linear motor for driving the movable units along the guide rail, wherein the linear motor comprises a stator and a plurality of rotors, wherein the stator comprises the stationary units, which each comprise one or a plurality of drive coils.

The rotors are arranged on the movable units and each comprise one or a plurality of magnets, wherein an energization of drive coils and a magnetic coupling with magnets of the movable units may be used to actuate the movable units along the guide rail, wherein the stationary units each comprise one or a plurality of energy-transmitting coils, wherein the movable unit comprises at least one energy-receiving coil, wherein energy may be transmitted to the at least one energy-receiving coil of the movable unit by energizing the energy-transmitting coils of the stationary units, wherein the movable unit and the further movable unit each have energy-transmitting elements, wherein an energy transmission from the further movable unit to the movable unit may be affected via a coupling of the energy-transmitting elements of the movable unit and the further movable unit, wherein the linear transport system comprises a controller.

The following steps are carried out by the controller:

- determining that the movable unit requires an amount of energy in order to carry out an application that cannot be provided via energy transmission between energy-transmitting coils of at least one stationary unit to the at least one energy-receiving coil of the movable unit; and
- outputting control signals to at least one stationary unit for positioning the further movable unit to a transmission position on the guide rail immediately in front of or behind the movable unit and for coupling energy-transmitting elements of the further movable unit to energy-transmitting elements of the movable unit.

This may achieve the technical advantage that an improved method for transmitting energy from a stationary unit of a linear transport system to a movable unit of the linear transport system may be provided, in which it is possible to take into account an increase in the energy provided for individual movable units of the transport system in the short term. For this purpose, the linear transport system comprises at least one stationary unit with at least one drive coil and a plurality of movable units, each of which comprises a rotor having a plurality of magnets, wherein the drive coils of the stationary units and the magnets of the rotors of the movable units may be magnetically coupled and form a linear drive of the linear transport system. By energizing the drive coils of the stationary units accordingly, the movable units may be moved along a guide rail of the stationary units.

For executing various applications with the aid of the movable units, which are formed for example by electrical tools or electrically operated technical processes embodied on and executable by the movable unit, a contactless energy supply of the applications of the movable units is affected by an energy transmission between energy-transmitting coils of the stationary units and corresponding energy-receiving coils of the movable units.

By actuating the energy-transmitting coils of the stationary units accordingly, energy may be transmitted to the corresponding movable units in order to carry out the corresponding applications of the movable units. The amount of energy that may be transmitted to a specific movable unit may be limited by characteristic configurations of the energy-transmitting coils of the corresponding stationary units and the energy-receiving coils of the movable units. The amount of energy that may be transmitted to a given movable unit at a given time by actuating the corresponding energy-transmitting coils of the stationary units, which may affect an energy transmission to the movable unit in a corresponding position of the movable unit on the guide rail, may thus be limited to a maximum transmissible energy value.

These characteristic properties of both the energy-transmitting coils of the stationary units and the energy-receiving coils of the movable units that limit the transmissible energy, which may comprise, for example, the number of windings, the size of the coil or the inductance of the coil, cannot be changed during operation of the linear transport system. The energy that may be transmitted per unit of time from a stationary unit to a movable unit via the described contactless energy transmission cannot therefore be increased above the maximum transmissible energy value.

In addition to the maximum value of the transmissible energy, a maximum frequency of the transmissible energy may represent a further limitation. With high-frequency energy transmission and the corresponding high-frequency switching of the energy-transmitting coils, a high level of heat may be generated within the energy-transmitting coils and the stationary units, which also represents a restriction on the energy transmission to be affected.

Due to the system-related limitations described above with regard to the contactless energy transmission between the stationary units and the movable units via the energy-transmitting coils of the stationary units and the energy-receiving coils of the movable units, it may be the case during operation of the linear transport system and in particular when different applications are carried out by the movable units that an amount of energy required to carry out an application by a movable unit cannot be affected in full via the control of the corresponding energy-transmitting coils and the corresponding energy transmission between the energy-transmitting coils of the stationary units and the energy-receiving coils of the movable unit. In this context, applications may be, for example, the execution of electrically operated tools or electrically operated manufacturing processes, machining processes or other technical processes.

In order to be able to ensure that the respective application may still be carried out without any problems despite the fact that the full amount of energy for carrying out the application cannot be provided via the contactless energy transmission, the method according to the application provides for a coupling between a movable unit carrying out the application and a further movable unit of the linear transport system via energy-transmitting elements of the two movable units provided for this purpose. Coupling the energy-transmitting elements of the two movable units allows for energy to be transmitted from the further movable unit to the movable unit carrying out the application. The amount of energy required to carry out the application may thus be provided via the energy transmission from the further movable unit to the movable unit carrying out the application. In particular, the further movable unit may provide the amount of energy that the movable unit still lacks in addition to the contactless energy transmission for executing the application.

The energy transmission from the further movable unit may thus be carried out simultaneously with the contactless energy transmission via the energy-transmitting coils of the stationary unit to the energy-receiving coils of the movable unit carrying out the application, so that part of the amount of energy required to carry out the application may be provided via the contactless energy transmission and part of the amount of energy may be provided via the coupling with the further movable unit. As an alternative, the execution of the application by the movable unit may also be affected solely on the basis of the energy provided by the coupling with the further movable unit, so that contactless energy transmission via the energy-transmitting coils/energy-receiving coils is not required.

In order to couple the two movable units to affect the energy transmission from the further movable unit to the movable unit carrying out the application, the method according to the application may further provide for positioning the further movable unit in a transmission position on the guide rail of the linear drive system. In this case, the transmission position is arranged on the guide rail directly in front of or behind the movable unit carrying out the application with respect to a direction of travel of the movable units along the guide rail and is characterized in that, when the further movable unit is positioned in the transmission position, it is possible to affect a coupling of the energy-transmitting elements of the two movable units arranged one behind the other.

BRIEF DESCRIPTION OF THE DRAWINGS

The application is described in more detail below with reference to embodiments and figures. In each case, the schematic depictions show.

DETAILED DESCRIPTION

Figure 1:
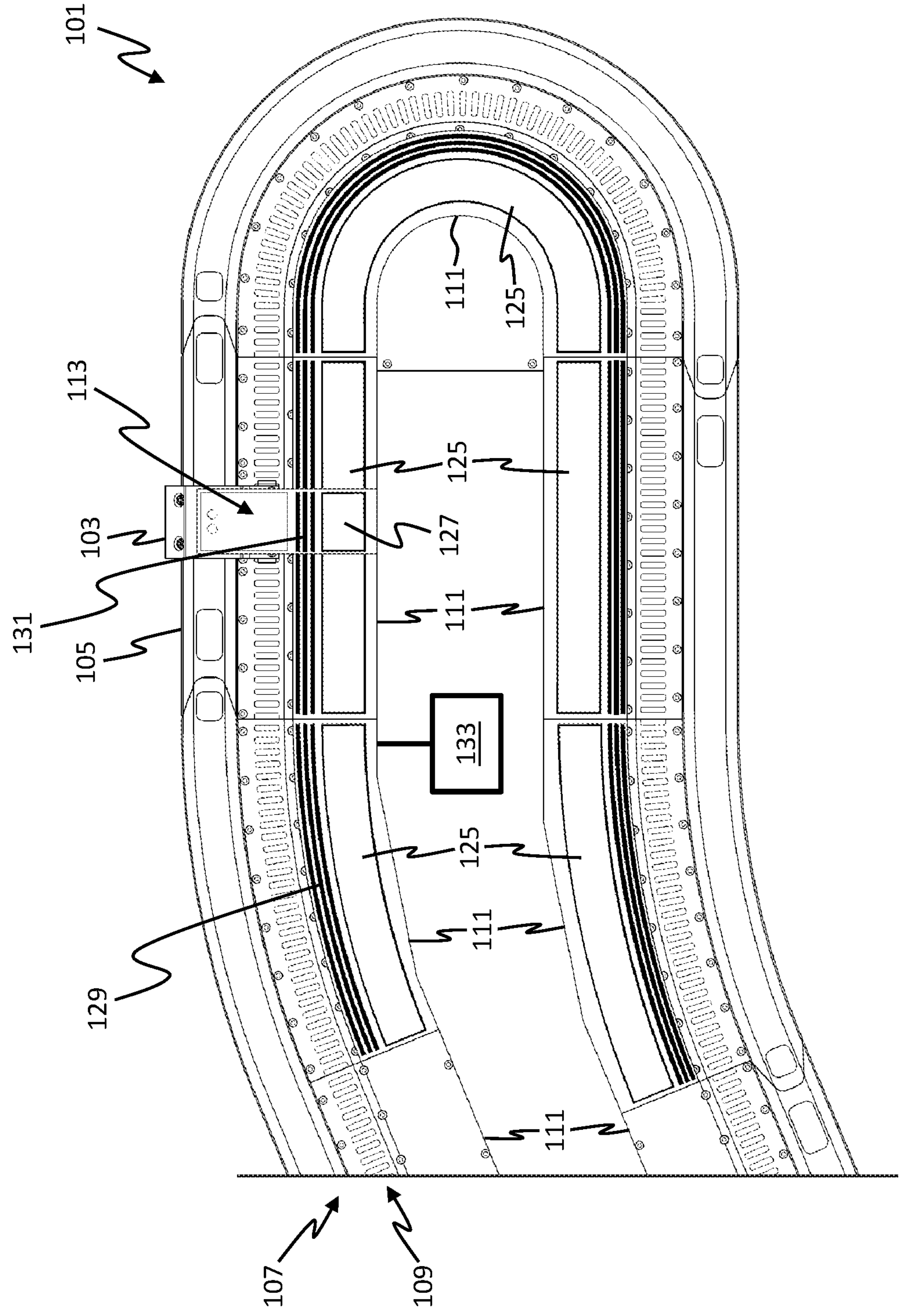
FIG. 1 shows a linear transport system.

For the purposes of the application, the transmission position is merely characterized by a position on the guide rail of the linear transport system arranged directly in front of or behind the movable unit. The transmission position does not describe an absolute position on the guide rail of the linear transport system, but merely describes a relative position of the further movable unit relative to the movable unit carrying out the application, to which the energy transmission is to be affected. The energy transmission position is thus defined by a spatial area directly in front of or behind the movable unit to which the energy transmission is to be affected. If a coupling of the two movable units is affected during a movement of the movable units along the guide rail, the transmission position follows the movable unit moving along the guide rail.

The further movable unit may be any movable unit within the linear transport system which, for example, also carries out an application or is capable of carrying out an application. Alternatively, the additional movable unit may be used explicitly for energy transmission and have an energy storage module, for example. A combination of the two alternatives is also possible in that the further movable unit comprises both an application to be carried out and an energy storage module and may be used both as a movable unit for energy transmission and as a movable unit for executing a corresponding application.

According to an embodiment, the further movable unit comprises at least one energy-receiving coil, wherein the controller further carries out the following step:

outputting control signals to at least one stationary unit for energizing at least one energy-transmitting coil and for transmitting an amount of energy from the energy-transmitting coil to the energy-receiving coil of the further movable unit positioned in the transmission position.

This may achieve the technical advantage that an improved energy transmission from the further movable unit to the movable unit carrying out the application may be provided. For this purpose, the further movable unit also comprises at least one energy-receiving coil, with the aid of which contactless energy transmission to the further movable unit is allowed for by controlling corresponding energy-transmitting coils of the stationary units of the linear transport system. In order to transmit energy from the further movable unit to the movable unit carrying out the application, when the two movable units are coupled via the energy-transmitting elements, the controller may also be used to actuate at least one energy-transmitting coil of a stationary unit to transfer energy to the energy-receiving coil of the further movable unit.

The contactless energy transmission to the two coupled movable units may be affected by actuating a single energy-transmitting coil, which affects an energy transmission both to the energy-receiving coil of the movable unit and to the energy-receiving coil of the further movable unit, or by activating at least two energy-transmitting coils, wherein one energy-transmitting coil affects an energy transmission to the energy-receiving coil of the movable unit and the other energy-transmitting coil affects an energy transmission to the energy-receiving coil of the further movable unit.

According to the application, the energy-transmitting coils of the stationary units of the linear transport system have larger dimensions in a longitudinal direction of the guide rail than the energy-receiving coils of the movable units. By activating an energy-transmitting coil, energy may thus be transmitted to the energy-receiving coils of a plurality of movable units arranged one behind the other on the guide rail. However, depending on the positioning of the coupled movable unit and the further movable unit, the activation of two energy-transmitting coils arranged one behind the other in the longitudinal direction of the guide rail may be advantageous for transmitting energy to the two movable units arranged one behind the other, in particular if the energy-receiving coils of the two movable units arranged one behind the other each cover different energy-transmitting coils arranged one behind the other in the longitudinal direction along the guide rail.

The amount of energy transmitted from the further movable unit to the movable unit carrying out the application may be controlled by transmitting energy to the further movable unit by actuating corresponding energy transmitter coils. For this purpose, the amount of energy transmitted to the further movable unit via the control of the energy-transmitting coil may be limited to the amount of energy required for the execution of the application by the movable unit. As described above, this amount of energy provided by the further movable unit may be the complete amount of energy required to carry out the application, in particular if no contactless energy transmission to the movable unit takes place. However, the amount of energy provided by the further movable unit may also be limited to the energy difference between the amount of energy required to carry out the application and the amount of energy provided to the movable unit carrying out the application via the contactless energy transmission between the energy-transmitting coils of the stationary units and the energy-receiving coils of the movable unit.

The further movable unit may be embodied as an alternative or in addition in order to carry out a further application. In this case, the amount of energy transmitted to the further movable unit by controlling the energy-transmitting coil may be embodied in such a way that the amount of energy transmitted is sufficient both to carry out the application with the aid of the further movable unit and to provide the amount of energy required to carry out the application with the aid of the movable unit. In practice, however, this may depend on the respective applications to be carried out by the two movable units and, in particular, on the amounts of energy required to carry out the applications in relation to the maximum amounts of energy that may be transmitted to the movable units via the contactless energy transmission.

According to an embodiment, the controller determines, based on the type of application to be carried out by the movable unit and the amount of energy required to carry out the application, that the amount of energy required to carry out the application cannot be provided via the energy transmission between energy-transmitting coils of at least one stationary unit and the energy-receiving coil of the movable unit.

The technical advantage of this is that it allows for precisely providing the amount of energy required by the movable unit to carry out the application. For this purpose, the controller determines the amount of energy required to carry out the process or application based on the process to be carried out by the application of the movable unit.

In the present embodiment, the situation is described in which the application to be carried out by the movable unit is embodied in such a way that, during normal operation, the application requires an amount of energy which cannot be provided via the contactless energy transmission by the stationary units of the movable unit carrying out the application. According to the application, the controller knows the various applications or processes that are carried out by the various movable units and knows the respective amounts of energy required to carry out the applications or processes. In addition, the controller knows the maximum energy values that may be transmitted via the contactless energy transmission with the aid of the energy transmitting and receiving coils.

In case that a movable unit has to carry out an application or a process that requires more energy than may be transmitted from the stationary units to the movable unit via the energy transmitting or receiving coils, the controller thus affects the energy transmission to the movable unit via the at least one further movable unit by coupling the two movable units via the energy-transmitting elements. The control of the further movable unit may thus be affected by the movable unit even before the application or the process is carried out, so that smooth execution of the application or the process is made possible in that the amount of energy required to carry out the application or the process may be provided via the coupling of the two movable units via the energy-transmitting elements and via the energy transmission with the aid of the energy transmitting or receiving coils.

According to an embodiment, the controller also carries out:

- receiving a signal message from the movable unit, the signal message from the movable unit signaling to the controller that the amount of energy required to carry out a process has not been provided.

This has the technical advantage that the method may be used to carry out the planned process even in unforeseen situations in which the energy required to carry out an application or process cannot be provided via the contactless energy transmission with the aid of the energy transmitting or receiving coils.

In the present embodiment, the situation is described in which the amount of energy required to run the application is unexpectedly not provided to the movable unit. This may occur, for example, in the event of an unforeseen energy transmission fault or because the application unexpectedly has an increased energy consumption.

In such a situation, the controller receives a corresponding signal message from the respective movable unit, in which it is signaled that insufficient energy is available to carry out the application of the movable unit. The controller then affects the actuation and coupling of a further movable unit to the movable unit via the energy-transmitting elements, as described above, and a corresponding energy transmission from the at least one further movable unit to the movable unit carrying out the application or process.

According to an embodiment, the linear transport system comprises at least one second further movable unit, wherein the second further movable unit comprises at least one energy-transmitting element, and wherein the controller further carries out the following steps:

- determining that the amount of energy that may be transmitted from the further movable unit to the movable unit is not sufficient to provide the amount of energy required to run the application; and
- outputting control signals to at least one stationary unit for positioning the second further movable unit in a second transmission position immediately in front of or behind the further movable unit and for coupling energy-transmitting elements of the second further movable unit and the further movable unit.

This has the technical advantage that a large number of movable units may be coupled to one another via the respective energy-transmitting elements and energy may be transmitted between the multiple movable units.

In the present embodiment, the situation is described in which the amount of energy provided to the movable unit carrying out the application via the contactless energy transmission between the energy transmitting and receiving coils and the coupling with the further movable unit is still not sufficient to be able to carry out the application. In such a case, a plurality of, in particular more than two, movable units may be coupled to one another via corresponding energy-transmitting elements, so that energy may be transmitted from one movable unit to the respective neighboring and coupled movable unit via the plurality of coupled movable units. Each of the coupled movable units may thus make a contribution to the movable unit carrying out the application, so that any amount of energy may be provided to the movable unit executing the application via a corresponding coupling of any number of movable units.

According to an embodiment, the coupling of the further movable unit with the movable unit takes place via the energy-transmitting elements during a movement of the movable unit and the further movable unit along the guide rail.

This may achieve the technical advantage that the provision of the additional energy via the coupling of the movable units via the energy-transmitting elements and the associated execution of the application or process is not restricted to a specific position of the movable units on the guide rail, but may be carried out during continuous travel of the movable units along the guide rail. This results in increased flexibility in energy transmission and improves the operation of the linear transport system, as the transportation of the objects and goods to be transported by the movable units does not have to be stopped and/or delayed for energy transmission.

According to an embodiment, the linear transport system comprises an energy supply module, wherein the energy supply module is arranged at an energy supply position along the guide rail, wherein the movable unit comprises an energy pick-off element, and wherein the controller further carries out the following steps:

- outputting control signals for moving the movable unit into the energy transmission position on the guide rail and for contacting the energy tapping element with a contacting element of the energy supply module,
- wherein an energy transmission from the energy transmission module to the movable unit may be affected by contacting the energy tapping element with the contacting element.

This may achieve the technical advantage that an additional energy transmission to the movable unit may be provided via an additional energy supply module of the linear transport system. For this purpose, the controller causes the positioning of the respective movable unit carrying out the application in an energy transmission position on the guide rail in which the respective energy transmission module is arranged. In the energy transmission position, contact is also made between at least one energy tapping element of the movable unit and at least one contacting element of the energy supply module, thereby allowing for energy to be transmitted from the energy supply module to the respective contacting movable unit.

For this purpose, the energy supply module may be embodied as a voltage source within the linear transport system and may, for example, be positioned stationary or movable along the guide rail of the stationary units. The energy transmission module is not embodied as a movable unit for this purpose and is not moved along the guide rail. Instead, the energy transmission module is decoupled from the guide rail and arranged next to it in a stationary or movable position. The energy transmission module may allow for additional energy to be transmitted, in particular if an energy transmission as described above with the aid of a coupling with further movable units is not available, for example because these are positioned in another area of the linear transport system, or if the amount of energy that may be provided via the coupling of the further movable units is still not sufficient to carry out the application.

According to a further aspect of the application, a further method for transmitting energy from a stationary unit of a linear transport system to a movable unit of the linear transport system is provided, wherein the linear transport system comprises at least one movable unit, a guide rail for guiding the movable unit, a plurality of stationary units and a linear motor for driving the movable unit along the guide rail, wherein the linear motor comprises a stator and at least one rotor, wherein the stator comprises the stationary units, which each comprise one or a plurality of drive coils.

The rotor is arranged on the movable unit and comprises one or a plurality of magnets, wherein an energizing of drive coils and a magnetic coupling with magnets of the movable unit may be used to actuate the movable unit along the guide rail, wherein the stationary units each comprise one or a plurality of energy-transmitting coils, wherein the movable unit comprises at least one energy-receiving coil, wherein energy may be transmitted to the at least one energy-receiving coil of the movable unit by energizing the energy-transmitting coils of the stationary units, wherein the linear transport system comprises an energy supply module, wherein the energy supply module is arranged at an energy supply position along the guide rail, wherein the movable unit comprises an energy tapping element.

The linear transport system comprises a controller, wherein the following steps are carried out by the controller:

outputting control signals for driving the movable unit into the energy transmission position on the guide rail and for contacting a contacting element of the energy supply module with the energy tapping element, wherein an energy transmission from the energy transmission module to the movable unit may be affected by contacting the energy tapping element with the contacting element.

This may achieve the technical advantage of an improved method for supplying energy to a movable unit. Via the energy supply module and the energy tapping element formed on the movable unit, a simple energy transmission to the movable unit may be achieved by moving the movable unit into the energy transmission position in which contacting of the energy tapping element of the movable unit and the contacting element of the energy transmission module is possible. The energy transmission from the energy transmission module to the movable unit may take place in addition to the contactless energy transmission with the aid of the energy-transmitting coils and the energy-receiving coils or instead of the contactless energy transmission.

According to a further aspect, a controller is provided which is arranged to carry out the methods according to the application for transmitting energy from a stationary unit of a linear transport system to a movable unit of the linear transport system according to one of the preceding embodiments.

According to a further aspect, a computer program comprising program code is provided which, when carried out on a computer, causes the computer to carry out the methods according to the application for transmitting energy from a stationary unit of a linear transport system to a movable unit of the linear transport system according to one of the preceding embodiments.

According to a further aspect, a machine-readable storage medium comprising the computer program according to the application is provided.

According to a further aspect, a movable unit for a linear transport system is provided, wherein the movable unit comprises a rotor with one or a plurality of magnets, wherein the movable unit may be driven along a guide rail of the stationary units by drive coils of stationary units of the linear transport system via the rotor, wherein the movable unit comprises at least one energy-transmitting element, wherein the energy-transmitting element may be coupled to an energy-transmitting element of a further movable unit, and wherein an energy transmission between the coupled movable units may be affected via a coupling of the energy-transmitting elements.

This may achieve the technical advantage of providing an improved movable unit for a linear transport system which is set up to affect a coupling with further movable units of the linear transport system via energy-transmitting elements and an energy transmission between the coupled movable units via the coupling.

According to an embodiment, the energy-transmitting element is embodied as a plug connection and comprises a plug element and/or a socket element.

This may achieve the technical advantage of allowing for the simplest possible coupling of the movable units via the energy-transmitting elements. Coupling of the movable units may be achieved via the energy-transmitting elements embodied as plug connections by positioning the movable units so close to one another that the plug connection is achieved by inserting the plug element of one movable unit into the matching socket element of the further movable unit. This makes the coupling as simple as possible, as the controller only has to control the positioning of the movable units in relation to one another other and the coupling is affected directly by the positioning and automatic insertion of the plug element into the socket element provided for this purpose. In addition, the embodiment as plug elements and/or socket elements means that contact may be achieved even if the two movable units are positioned inaccurately in relation to one another. Furthermore, when the plug element is inserted into the corresponding socket element, contact may be maintained even if the relative positioning of the two movable units to one another fluctuates. This may occur, for example, if the two movable units are moved further along the guide rail at slightly different speeds during coupling.

According to an embodiment, the plug element is embodied at a first end and the socket element is embodied at a second end of the movable unit opposite the first end.

This may achieve the technical advantage that each movable unit may be directly coupled to two further movable units with energy-transmitting elements embodied at the two opposite ends. For this purpose, the energy-transmitting elements may be embodied at two opposite ends of the movable units in the direction of travel of the respective movable units, so that each movable unit may be coupled with a further movable unit positioned directly in front of the respective movable unit and a further movable unit positioned directly behind the respective movable unit. This may allow for a series of any number of movable units coupled to one another, wherein energy transmission from one movable unit to the next movable unit of any energy value may be achieved by each coupled movable unit providing a share of the transmitted energy.

According to an embodiment, the plug element and/or the socket element are spring-mounted in a longitudinal direction and/or a transverse direction of the plug element and/or the socket element.

This may achieve the technical advantage that a frictionless coupling of movable units is allowed for by the plug elements and/or socket elements of the energy-transmitting elements, which are spring-mounted in the longitudinal and/or transverse direction. The spring-mounting allows for the movable units to be coupled to one another, in particular by driving them onto one another, in which the movable units are positioned so close with regard to one another that the plug elements are inserted into the matching socket elements, without causing damage to the energy-transmitting elements or the movable units. In particular, this makes it easy to couple the individual movable units while they are moving.

According to an embodiment, the plug element is elastically deformable in a transverse direction of the plug element.

This has the technical advantage that the elastic deformability in a transverse direction of the connector element means that coupling of the movable units via the energy-transmitting elements may also be carried out or maintained during cornering, in which the movable units tilt relative to each other in the transverse direction. The coupling of the movable units and the associated energy transmission is therefore not limited to straight sections of the guide rail of the linear transport system.

According to an embodiment, the movable unit comprises an application for carrying out a process, wherein the energy-transmitting element is connected to an application electronics of the application via a coupling circuit, and wherein the coupling circuit comprises at least one rectifying element that prevents a current flow from the application electronics into the energy-transmitting element.

This achieves the technical advantage that cross-currents between the coupled movable units may be avoided. In particular, the rectifying elements may prevent the flow of current from the application of the movable unit to be supplied with energy in the direction of the other coupled movable unit. A current flow thus takes place exclusively from the coupled further movable unit in the direction of the movable unit executing the application, so that a targeted energy transmission to the movable unit executing the application may be achieved. This may also prevent damage to the application electronics of the movable unit as well as damage to electronic components of the coupled additional movable unit.

According to an embodiment, the movable unit comprises an energy tapping element for contacting a contacting element of an energy supply module of a stationary unit of a linear transport system, wherein an energy transmission from the energy transmission module to the movable unit may be affected by contacting the energy tapping element with the contacting element.

This may achieve the technical advantage that the movable unit is set up via the energy tapping element to affect an energy transmission from an energy supply module of a stationary unit of the linear transport system.

According to a further aspect, a linear transport system is provided comprising a controller according to the application, a plurality of movable units according to one of the preceding embodiments and a stationary unit comprising a stator with one or a plurality of drive coils for driving a rotor of a movable unit along a guide rail of the stationary unit, wherein the stationary unit comprises at least one energy-transmitting coil and at least one movable unit comprises at least one energy-receiving coil for transmitting energy between the stationary unit and the movable unit, and wherein the stator of the stationary unit and the rotors of the movable units form a linear drive of the linear transport system.

This may provide the technical advantage of providing an improved linear transport system that is set up to carry out the method described above for transmitting energy from a stationary unit to a movable unit.

According to an embodiment, the stationary unit comprises an energy supply module with a contacting element, wherein an energy transmission from the stationary unit to the movable unit may be realized via a contacting between an energy tapping element of a movable unit and the contacting element of the energy supply module.

The technical advantage of this is that it also enables energy to be transmitted from a power supply module to a movable unit.

In the following, the same reference numerals may be used for identical features. Furthermore, for reasons of clarity, it may be the case that not all elements are shown in every figure. Furthermore, for the sake of clarity, it may be the case that not every element is provided with its own reference numeral in every drawing.

FIG. 1 shows a linear transport system 101. The linear transport system 101 comprises a movable unit 103, which is guided by a guide rail 105. The movable unit 103 comprises rollers and a rotor 113 comprising magnets. The rollers of the movable unit 103 may roll on running surfaces of the guide rail 105.

The linear transport system 101 further comprises a linear motor 107, wherein the linear motor 107 comprises a stator 109. The stator 109 of the linear motor 107 is arranged in the stationary units 111, each of which comprises a plurality of drive coils for this purpose. The stationary units 111 in FIG. 1 are partially embodied differently, wherein individual stationary units 111 may be straight or curved. The linear motor 107 further comprises the rotor 113, which is arranged on the movable unit 103 and comprises one or a plurality of magnets. The stationary units 111 each comprise an energy-transmitting coil 125. The movable unit 103 comprises an energy-receiving coil 127. In an alternative embodiment, a stationary unit 111 may also comprise a plurality of energy-transmitting coils 125. In addition, the linear transport system 101 may comprise further stationary units 111, each of which does not comprise any energy-transmitting coils 125, and which therefore cannot contribute to the energy transmission.

The stationary units 111 further comprise optional stationary antennas 129. The movable unit 103 comprises an optional movable antenna 131. The movable antenna 131 is fixed to the movable unit 103, but may move along the guide rail 105 together with the movable unit 103. With the aid of the stationary antennas 129 and the movable antenna 131, data may be exchanged between the stationary units 111 and the movable unit 103. As an alternative, however, such data transmission may also be embodied, for example, with the aid of a wireless LAN or a Bluetooth or an infrared connection or a 5G connection or according to the DECT standard or as optical transmission. In that case, the stationary unit 111 does not comprise the stationary antenna 129. The movable unit 103, in this case, does not comprise the movable antenna 131, as shown in each case in FIG. 1. However, other antennas may be arranged on the movable unit 103. The stationary antennas and/or the movable antennas may be arranged completely independently of the embodiment shown in FIG. 1.

The linear transport system 101 further comprises a controller 133 which is directly connected either to one of the stationary units 111 or to all of the stationary units 111. Shown in FIG. 1 is a connection to one of the stationary units 111. In this case, it may be provided that the stationary units 111 comprise a communication bus with the aid of which signals from the controller 133 may be exchanged between the stationary units 111. Furthermore, other communication units may be arranged between the controller 133 and the stationary unit or units.

Figure 2:
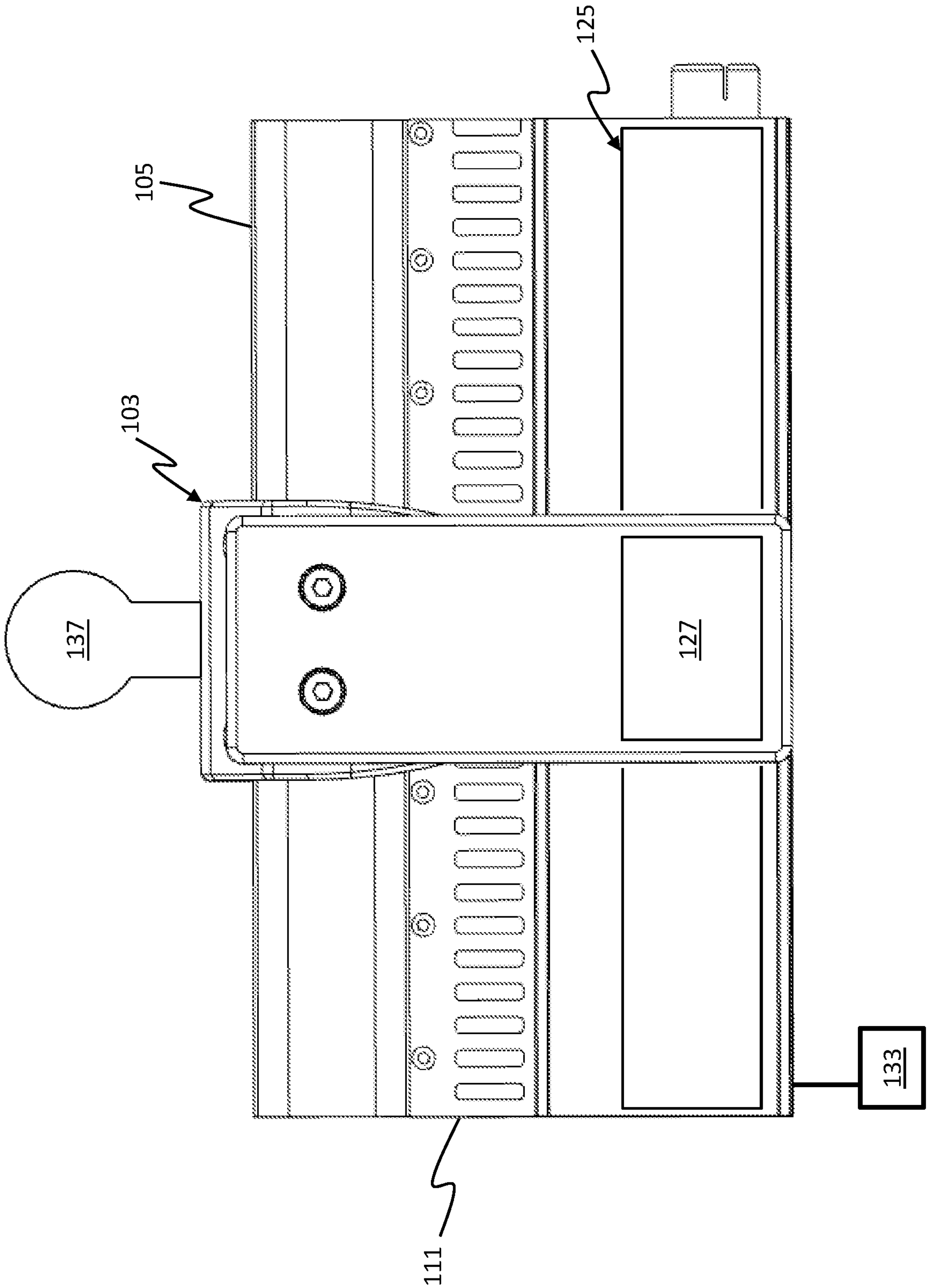
FIG. 2 shows a section of the linear transport system of FIG. 1.

FIG. 2 shows a more detailed view of a stationary unit 111 on which a movable unit 103 is arranged. The movable unit 103 comprises an application 137 for carrying out a process. The application 137 may, for example, be embodied as an electrical tool. In order to be able to operate the application 137, an energy transmission to the movable unit 103 is necessary. This energy transmission may take place as a contactless energy transmission with the aid of the energy-transmitting coil 125 of the stationary unit 111 and the energy-receiving coil 127 of the movable unit 103. If the energy-transmitting coil 125 is energized, for example with an alternating current, a corresponding magnetic field is generated, which induces a voltage in the energy-receiving coil 127 via a magnetic coupling. This induced voltage may then be used to supply the application 137 of the movable unit 103 with energy.

Figure 3:
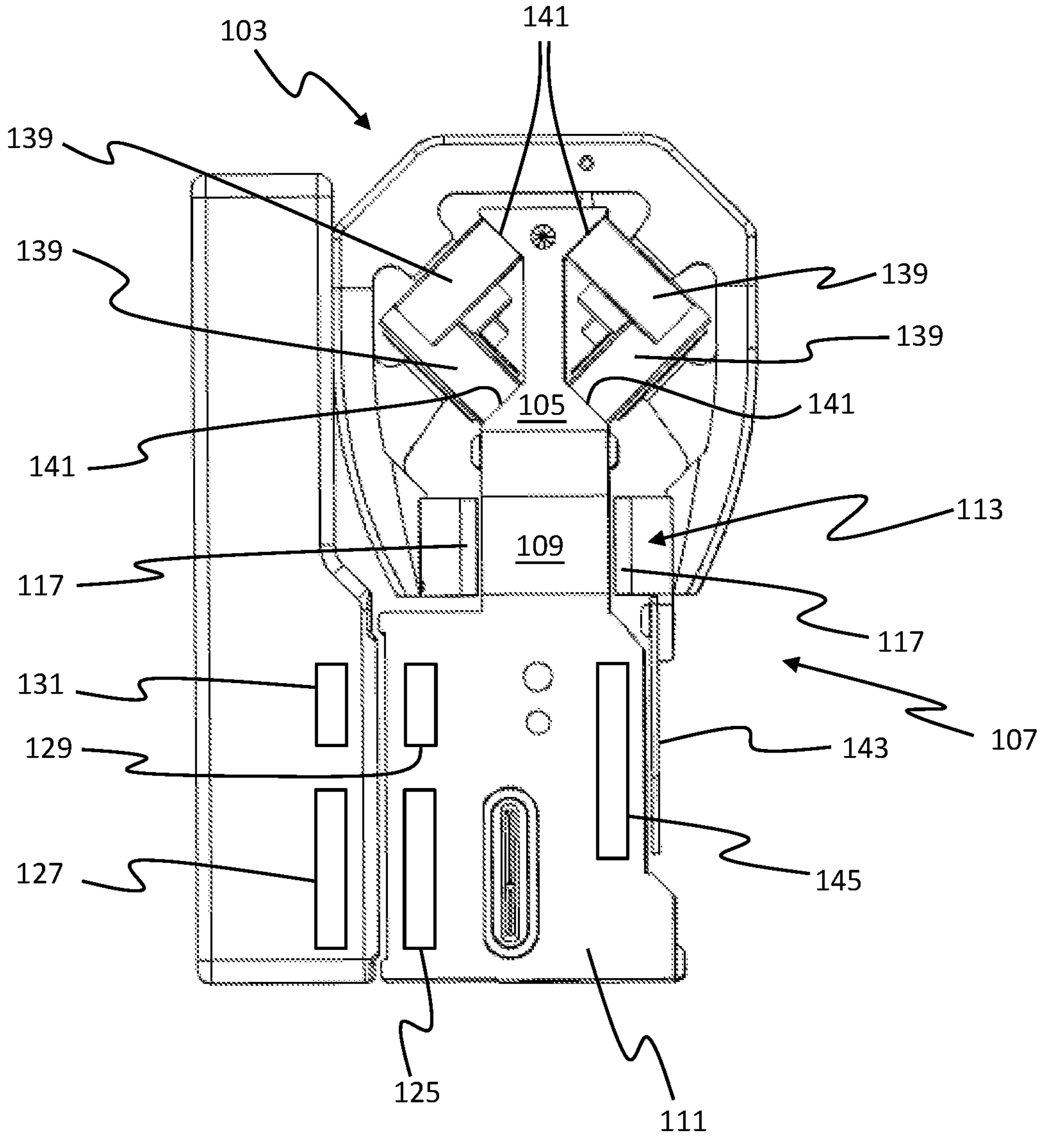
FIG. 3 shows a lateral top view of the section of the linear transport system of FIG. 2.

FIG. 3 shows a lateral top view of a stationary unit 111 including a guide rail 105 on which a movable unit 103 is arranged. The movable unit 103 may also be guided with the aid of alternative embodiments. Rollers 139 of the movable unit 103 may roll on running surfaces 141 of the guide rail 105 and thus allow for an essentially one-dimensional movement of the movable unit 103 along the guide rail 105. Also shown in FIG. 3 are magnets 117 of the movable unit 103, which form the rotor 113 of the linear motor 107. Also shown is the stator 109 of the linear motor 107, which is formed from stator teeth and drive coils. Below the magnets 117 and the stator 109, the movable unit 103 comprises a position-detecting element 143. The stationary unit 111 comprises a position sensor 145 in this area. The position sensor 145 may, for example, measure an induction behavior of a coil that is changed by a piece of metal embedded in the position-detecting element 143.

For this purpose, the position sensor 145 may, for example, comprise an energized coil in which a change in inductance causes a change in the current in the coil when the position-detecting element 143 travels by, and thus the position of the position-detecting element 143 and thus of the movable unit 103 may be detected. However, the position sensor 145 may of course also be embodied differently, for example with an excitation coil and a receiving coil in each case, with the aid of which an inductance of the metal piece embedded in the position-detecting element 143 is measured, as well. Furthermore, magnets 117 embedded in the position-detecting element 143 or a light barrier evaluation for position determination are also possible, for example.

Current may be supplied to the movable antenna 131 and to the application 137 via the energy-transmitting coil 125 or energy-receiving coil 127 shown in FIGS. 1 to 3. It may be provided that the movable unit 103 comprises an energy storage device, wherein the energy storage device may be embodied as a capacitor, accumulator, supercap or supercapacitor, super-conducting magnetic energy storage device or as a flywheel. This allows for energy to be stored, for example in order to transmit a larger amount of energy in advance over a longer period of time for actions of the application 137 that require a higher power in the short term than may be provided with the aid of the energy-transmitting coil 125. In addition, energy may be stored in this manner in order to bridge larger areas without energy transmission and still be able to maintain communication there with the aid of the movable antenna 131 or in order to carry out a process of the application 137 there.

In order to transmit energy from the stationary unit 111 to the movable unit 103 of the linear transport system 101, the position data of the movable unit 103 may first be determined by the controller 133. This position data may comprise a position of the movable unit 103 relative to the stationary units 111 of the linear transport system 101. It may be provided to determine the position data with the aid of the position sensor 145. Subsequently, at least one of the energy-transmitting coils 125 is selected.

The selection is based on the position data. It may be provided that the energy-transmitting coil 125 is selected in such a way that the selected energy-transmitting coil 125 is located at least partially, in particular completely, opposite to the energy-receiving coil 127. The selection may comprise both the selection of the stationary unit 111 and, if the stationary unit 111 comprises a plurality of energy-transmitting coils 125, the selection of the energy-transmitting coil 125 within the stationary unit 111. It may be provided that, in the case of stationary units 111 which comprise a plurality of individually controllable energy-transmitting coils 125, a plurality of the energy-transmitting coils 125 is also selected for energy transmission. Furthermore, if the movable unit 103 is arranged exactly at a transition between two energy-transmitting coils 125 of two stationary units 111, it may be provided to select both energy-transmitting coils 125.

The selection of the energy-transmitting coils 125 may also be embodied in such a way that either a good transmission is allowed for or that a poorer energy transmission is specifically selected, wherein the energy to be transmitted may thereby be controlled.

After selecting the at least one energy-transmitting coil 125 within the linear transport system 101 using the position data, a control signal is output by the controller 133, which may comprise identification information with the aid of which the at least one energy-transmitting coil 125 may be identified. Alternatively, the identification information may be omitted. Identification of the respective energy-transmitting coil 125 may in particular be achieved by positioning the energy-transmitting coil 125 along the guide rail 105.

In an embodiment example, the control signal comprises energy quantity information. The energy quantity information comprises the amount of energy that is to be transmitted. This control signal is output by the controller 133 to the corresponding stationary unit 111. Within the stationary unit 111, the energy-transmitting coil 125 may then be energized in such a way that the amount of energy defined by the energy quantity information is transmitted to the movable unit 103. The amount of energy to be transmitted may be given by the power required for a period of time to operate the application 137.

It may be provided that the energy quantity information comprises an amplitude and/or a frequency of an alternating voltage or of an alternating current. Both with the aid of an amplitude and with the aid of a frequency of an alternating voltage/current, an energy and/or power transmitted via the energy-transmitting coil 125 to the energy-receiving coil 127 may be set.

It may be provided that the stationary unit 111 selects the frequency and/or the amplitude independently, for example with the aid of a corresponding table or a corresponding software program carried out by the stationary unit 111. This allows for the energy amount to be transmitted to be optimally dimensioned and transmitted. For this purpose, it may be useful to communicate the position data and optionally also a dimension of the movable unit 103 to the stationary unit 111.

The amount of energy may comprise a load energy amount at a first point in time and an idle energy amount at a second point in time. The amount of load energy is sufficient to operate the application 137 arranged on the movable unit 103. The idle energy amount is maximally sufficient to maintain an energy supply to a communication unit of the movable unit 103. This means that when the movable unit 103 is at a point where an action of the application 137 is required, a higher amount of energy, namely the amount of energy required to operate the application 137, is transmitted. At other points, it may be provided to transmit only a maximum amount of energy sufficient to maintain communication via the stationary antennas 129 and the movable antenna 131.

The position data may be determined on the basis of a measurement of at least one position sensor 145. The position data may also be determined by energizing the linear motor 107. Both options may be sufficient to determine a position of the movable unit 103 relative to the stationary units 111 with sufficient accuracy to select the energy-transmitting coil 125. A further way of determining the position data is to use a magnetic field sensor, for example a (3D) Hall sensor, to measure a position of one or of a plurality of magnets 117 of the movable unit.

In addition to the energy transmission from the energy-transmitting coils 125 to the energy-receiving coils 127, an energy transmission in the opposite direction is also possible in certain situations. This may occur, for example, if more energy than required has been transmitted to the movable unit 103, in particular if the movable unit 103 comprises an energy storage device as described above. If the energy storage device of the movable unit 103 comprises an accumulator, it may be provided to discharge this in a targeted manner in order to extend the service life of the accumulator by discharging the accumulator to the predetermined charge level if a predetermined charge level, for example 80% of the maximum charge, is exceeded.

Figure 4A:
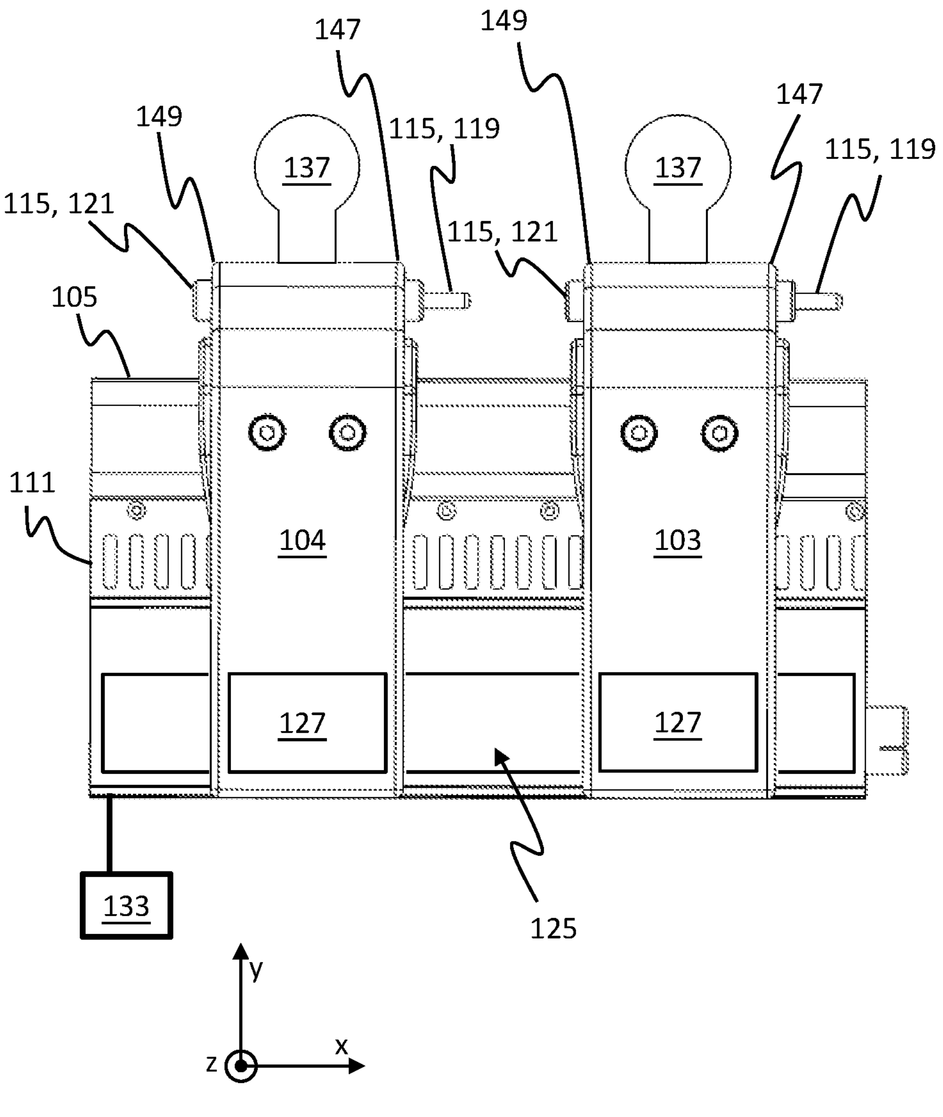
FIGS. 4A and 4B show a stationary unit with two movable units that may be coupled, in an uncoupled and a coupled position.
Figure 4B:
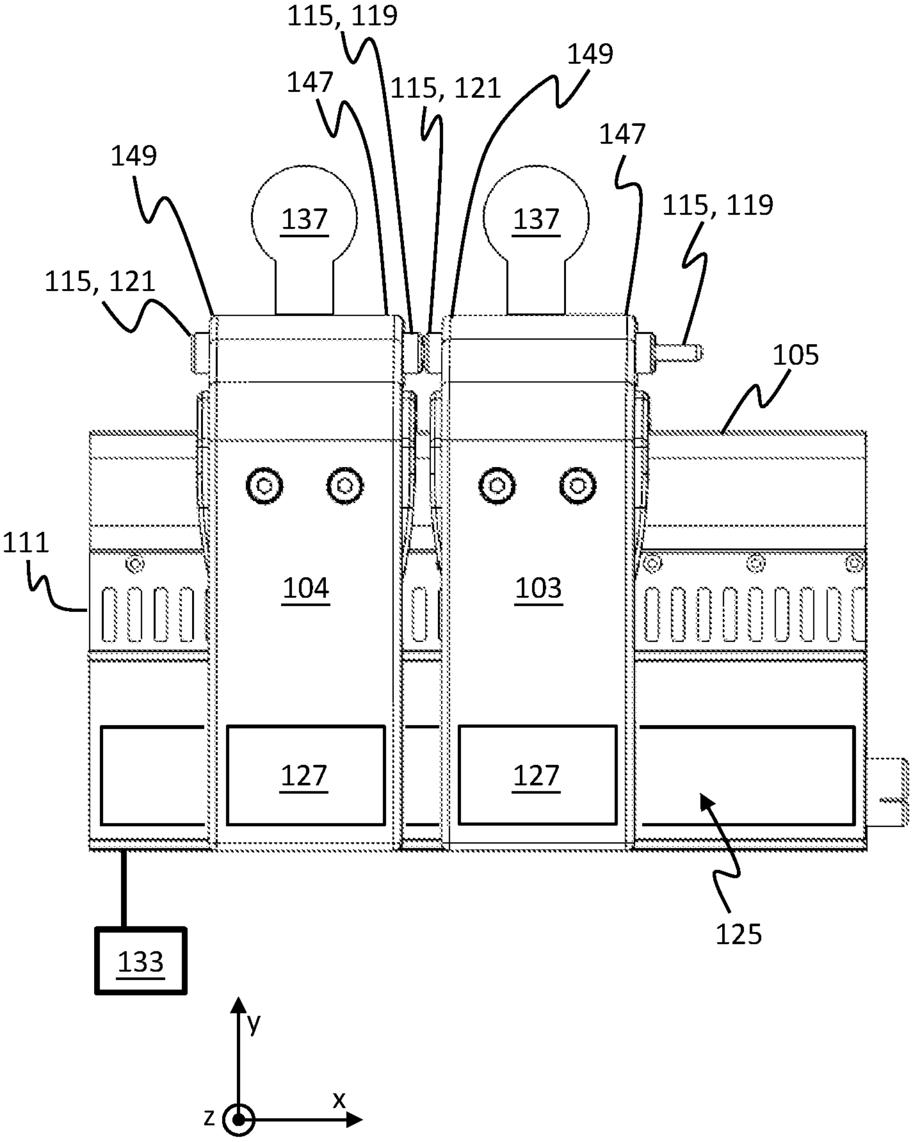

FIGS. 4A and 4B show a schematic depiction of a stationary unit 111 with two movable units 103, 104 that may be coupled, in an uncoupled position in FIG. 4A and in a coupled position in FIG. 4B.

In the embodiment shown, the movable unit 103 and the further movable unit 104 each comprise energy-transmitting elements 115, with the aid of which coupling of the movable units 103, 104 to one another is allowed for. In the embodiment shown, the energy-transmitting elements 115 are embodied as plug elements 119 or corresponding socket elements 121. In this case, the plug elements 119 are embodied at a first end 147 of the respective movable unit 103, 104, while the socket elements 121 are arranged at a second end 149 arranged opposite to the first end 147 in the longitudinal direction x of the movable units 103, 104.

According to the embodiment of FIG. 2, the movable units 103, 104 each comprise an energy-receiving coil 127, while the stationary unit 111 shown comprises an energy-transmitting coil 125. Furthermore, the movable units 103, 104 each comprise an application 137. With the aid of the contactless energy transmission from the energy-transmitting coil 125 to the energy-receiving coils 127 of the movable units 103, 104, the applications 137 may be carried out. The applications 137 may be embodied, for example, by electrically operated tools, electrically operated manufacturing processes, electrically operated packaging processes or other electrically operated processes. In the embodiment shown, the applications 137 of the movable units 103, 104 shown may be the same or different processes or applications that may be carried out separately from one another.

Depending on the type of the corresponding application 137 or the processes carried out by the application 137, different amounts of energy may be required to carry out the application 137. For example, an application 137 of a movable unit may be provided by a heating process of an object to be heated. Such heating processes are energy-intensive and a correspondingly high amount of energy may be required to carry out such processes or applications 137. Similarly, an application 137 may comprise an electric motor that requires increased power for operation for a certain period of time, which cannot be provided to the full extent exclusively via the contactless energy transmission with the aid of the energy emitting coils 125 and the energy-receiving coils 127.

The amount of energy that may be transmitted via the contactless energy transmission with the aid of the energy-transmitting coils 125 of the stationary units 111 and the energy-receiving coils 127 of the movable units 103, 104 in a predetermined time interval is limited to a maximum energy amount per movable unit 103, 104. This limitation may in particular be due to characteristic embodiments of the energy-transmitting coils 125 of the stationary units 111 or the energy-receiving coils 127 of the movable units 103, 104, which may include, for example, the dimensions of the coil, the number of turns of the coil or the inductance of the coil. A further limitation of the maximum amount of energy that may be transmitted may be caused by the required control of the energy-transmitting coils 125. Particularly in the case of high-frequency energy transmission, strong heating of the energy-transmitting coils 125 may further limit the maximum amount of energy that may be transmitted.

Depending on the type or configuration of the respective application 137 to be carried out or the process to be carried out, the situation may thus arise that the amount of energy required for an application 137 to be carried out cannot be provided by the contactless energy transmission with the aid of the energy-transmitting coils 125 of the stationary units 111 and the energy-receiving coils 127 of the respective movable unit 103 executing the application 137.

According to the method 100 according to the application, in such a case, the controller 133 determines that the amount of energy required in order to carry out the application 137 of a movable unit 103 of the linear transport system 101 cannot be provided to the movable unit 103 via the contactless energy transmission with the aid of the energy-transmitting coils 125 of the static units 111 and the energy-receiving coils 127 of the movable unit 103.

The controller 133 may achieve this detection of insufficient energy supply based on the type or configuration of the particular application 137 or process to be carried out. For this purpose, the controller 133 may comprise information regarding the applications 137 or processes to be carried out by the individual movable units 103, 104 and the amounts of energy required in order to carry out the applications 137 or processes. Such information may, for example, be stored in corresponding databases in the controller 133.

Based on such information regarding the applications 137 to be carried out by the movable units 103, 104 and the amount of energy required for execution, the controller 133 may thus determine, prior to carrying out the respective application 137, whether the amount of energy that may be provided via the contactless energy transmission with the aid of the energy-transmitting coils 125 or energy-receiving coils 127 of the respective movable unit 103 is sufficient. For this purpose, the controller may comprise additional information regarding the maximum amount of energy that may be provided to the individual movable units 103, 104 via the contactless energy transmission. Such information may in turn be stored in databases provided for this purpose.

Before an application 137 is carried out by a movable unit 103, the controller 133 may thus check whether this application 137 may be carried out using the contactless energy transmission.

As an alternative, in order to determine with the aid of the controller 133 that the amount of energy that may be provided is not sufficient for carrying out the application 137 with the aid of the movable unit 103, a signal message from the movable unit 103 may be received by the controller 133 in accordance with the method according to the application. Via the signal message, the controller 133 may thus be signaled by the movable unit 103 that the amount of energy required to carry out the application 137 cannot be provided via the contactless energy transmission with the aid of the energy-transmitting or energy-receiving coils 125, 127. Such a signal message may be used to take into account situations in which the amount of energy required to run the application 139 is not or cannot be provided unexpectedly. This may occur, for example, in the event of faults in the contactless energy transmission or the application, in which a smaller amount of energy or no energy at all may be transmitted, or the application 137 requires an increased amount of energy.

According to a further method step, the controller 133, after determining that the energy available via the contactless energy transmission is insufficient to carry out the application 137 of the movable unit 103, outputs control signals to at least one drive coil of at least one stationary unit 111 in order to drive the further movable unit 104 along the guide rail 105 and to position it in a transmission position on the guide rail 105 immediately in front of or behind the movable unit 103 and to couple the further movable unit 104 to the movable unit 103 via the energy-transmitting elements 115. Such a coupling of the movable units 103, 104 is shown in FIG. 4B.

The transmission position in which the further movable unit 104 is positioned relative to the movable unit 103 for coupling with the movable unit 103 does not define an absolute position on the guide rail 105, but merely describes a relative position to the movable unit 103, in which the further movable unit 104 is positioned directly in front of or behind the movable unit. The positioning directly in front of or behind the movable unit 103 in this context refers to the direction of travel of the movable unit 103, which is oriented in particular along the longitudinal direction x, both of the movable units 103, 104 and of the guide rail 105.

By positioning the further movable unit 104 in the transmission position, a coupling of the two movable units 103, 104 is achieved via the energy-transmitting elements 115. As shown in FIG. 4B, the positioning of the further movable unit 104 in the transmission position causes the plug element 119 of the further movable unit 104 to be inserted into the socket element 121 of the movable unit 103, wherein the coupling of the movable units 103, 104 is affected.

The coupling of the two movable units 103, 104 via the energy-transmitting elements 115 may in this context be achieved exclusively by positioning the further movable unit 104 directly in front of or behind the movable unit 103, in that the further movable unit 104 is moved onto the movable unit 103 in such a way that the plug elements 119 of the further movable unit 104 are inserted into the socket elements 121 of the movable unit 103. In the illustration, the further movable unit 104 is thus positioned in the direction of the longitudinal direction x directly behind the movable unit 103. Alternatively, the further movable unit 104 may be positioned directly in front of the movable unit 103 with respect to the longitudinal direction x shown, so that the plug elements 119 of the movable unit 103 are inserted into the socket elements 121 of the further movable unit 104 for coupling.

According to an embodiment, the plug elements 119 or the socket elements 121 may be spring-mounted along the longitudinal direction x and/or along a transverse direction y, z. This enables damage-free coupling of the movable elements 103, 104 by inserting the plug elements 119 into the socket elements 121. According to an embodiment, the plug elements 119 may be embodied to be elastically deformable in a transverse direction y, z. This allows for coupling the movable units 103, 104 when the movable units 103, 104 move around a curve. For this purpose, the plug elements 119 may, for example, comprise a cable element, with the aid of which the plug elements 119 may be elastically deformed accordingly.

According to an embodiment, the above-described coupling of the movable units 103, 104 may be achieved during a movement of the movable units 103, 104 along the guide rail 105. For this purpose, the controller 133 causes the positioning of the further movable unit 104 directly in front of or behind the movable unit 103 by outputting corresponding control signals to the drive coils of the stationary units 111, without the movable unit 103 being stopped for this purpose and the movement of the movable unit 103 being stopped.

By coupling the movable units 103, 104, it is possible to transmit energy from the further movable unit 104 to the movable unit 103. For this purpose, the further movable unit 104 may, for example, comprise a voltage source with the aid of which the amount of energy to be transmitted may be provided. The voltage source may, for example, be embodied as an accumulator.

In the embodiment shown, the further movable unit 104 does not comprise such a voltage source and is instead embodied with an energy-receiving coil 127. For the purpose of transmitting energy from the further movable unit 104 to the movable unit 103, an energy transmission to the energy-receiving coil 127 of the further movable unit 104 may thus be affected by the controller 133 by outputting corresponding control signals to the energy-transmitting coil 125 of the stationary unit 111. The energy thus transmitted to the further movable unit 104 via the contactless energy transmission may be transmitted from the further movable unit 104 to the movable unit 103 via the coupling of the two movable units 103, 104 via the energy-transmitting elements 115.

As an alternative to the situation shown in FIGS. 4A and 4B, the two movable units 103, 104 may each be positioned at two different stationary units 111. An energy transmission may then be affected by the one stationary unit 111 with the aid of the respective energy-transmitting coil 125 to the energy-receiving coil 127 of the movable unit 103, while an energy transmission to the further movable unit 104 is affected by an energy-transmitting coil 125 of the further stationary unit 111, above which the further movable unit 104 is positioned. The two stationary units 111 and in particular their energy-transmitting coils 125 may be controlled individually, so that energy is only transmitted to the movable unit 103 via the energy-transmitting coil 125 of the one stationary unit 111, while energy is transmitted exclusively to the further movable unit 104 via the energy-transmitting coil 125 of the further stationary unit 111. The total amount of energy transmitted to the two movable units 103, 104 may be increased compared to the case shown in FIGS. 4A and 4B by the separately controlled energy-transmitting coils 125, in particular if the amount of energy to be transmitted to the two movable units 103, 104 exceeds the maximum amount of energy that may be transmitted by the energy-transmitting coil 125 of a stationary unit 111.

In order to carry out the application 137 with the aid of the movable unit 103, a maximum amount of energy that may be provided may thus be transmitted by the contactless energy transmission with the aid of the energy-transmitting coil of the stationary unit 111 and the energy-receiving coil 127 of the movable unit 103. By coupling the further movable unit 104 to the movable unit 103 via the energy-transmitting elements 115, the difference in energy between the amount of energy required to carry out the application 137 and the maximum amount of energy that may be provided via the contactless energy transmission may be transmitted from the further movable unit 104 to the movable unit 103.

The amount of energy to be transmitted from the further movable unit 104 to the movable unit 103 may further be controlled by the controller 133 by defining the amount of energy to be transmitted by the controller 133 by outputting corresponding control signals to the further movable unit 104. As an alternative, the amount of energy to be transmitted from the further movable unit to the movable unit 103 may be automatically controlled by an application electronic unit of the application 137 of the movable unit 103, in that the application electronic unit of the application 137 automatically controls the amount of energy provided by the coupled further movable unit 104 to the amount of energy required to carry out the application 137, so that only the amount of energy required to carry out the application 137 is transmitted from the further movable unit 104 to the movable unit 103.

This amount of energy may, for example, be given by the difference between the amount of energy required to carry out the application and the amount of energy that may be provided by the contactless energy transmission with the aid of the energy transmitter/receiver coils 125, 127. As an alternative or in addition, the controller 133 may control the stationary unit 111 by outputting corresponding control signals in such a way that the amount of energy to be transmitted from the further movable unit 104 to the movable unit 103 is transmitted to the energy-receiving coil 127 of the further movable unit 104 via the respective energy-transmitting coil 125. By controlling the energy-transmitting coil 125 of the stationary unit 111 accordingly, the exact amount of energy required for the execution of the application 137 by the movable unit 103 may be transmitted contactlessly from the stationary unit 111 to the further movable unit 104 and transmitted from the further movable unit 104 to the movable unit 103 via the coupling between the movable units 103, 104.

Loss affects in energy transmission both in a non-contact manner with the aid of the energy transmitting and receiving coils 125, 127 and via the coupling of the energy-transmitting elements 115 can be taken into account throughout the description when determining the amount of energy to be transmitted.

During the energy transmission from the further movable unit 104 to the movable unit 103, the respective application 137 of the movable unit 104 may continue to be carried out by the movable unit 104. However, execution of the application 137 of the movable unit 104 depends on the amount of energy required to carry out the application 137. Depending on the prioritization of the applications 137 of the movable units 103, 104, an execution of the application 137 by the further movable unit 104 may be interrupted during the coupling of the two movable units 103, 104 in order to be able to ensure that sufficient energy may be provided to the movable unit 103 by the further movable unit 104. If the amount of energy to be provided by the further movable unit 104 to the movable unit 103 is so small that execution of the application 137 of the further movable unit 104 is possible, both applications 137 may be carried out by the respective movable units 103, 104 during the coupling.

As an alternative to the situation shown in FIGS. 4A and 4B with only one further movable unit 104, the movable unit 103 may also be coupled with two further movable units 104. For this purpose, in addition to the coupling of the movable units 103, 104 shown in FIGS. 4A and 4B, an additional further movable unit 104 may be coupled to the movable unit 103 via a coupling of the energy-transmitting elements 115 at the first end 147 of the movable unit 103. In this case, the coupling of the energy-transmitting elements 115 takes place analogously to the process described above, in that the plug elements 119 of the movable unit 103 are inserted into the corresponding socket elements of the further movable units 104.

Figure 5A:
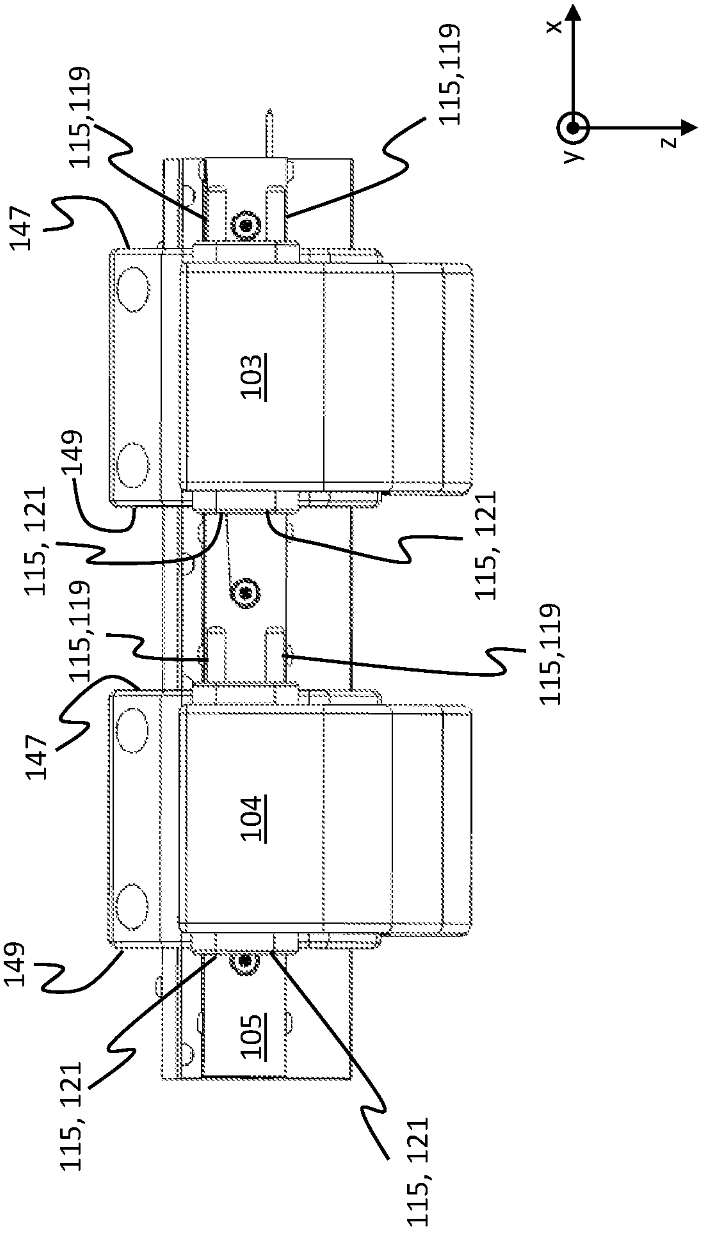
FIGS. 5A and 5B show a top view of the stationary unit and the two movable units in FIGS. 4A and 4B.
Figure 5B:
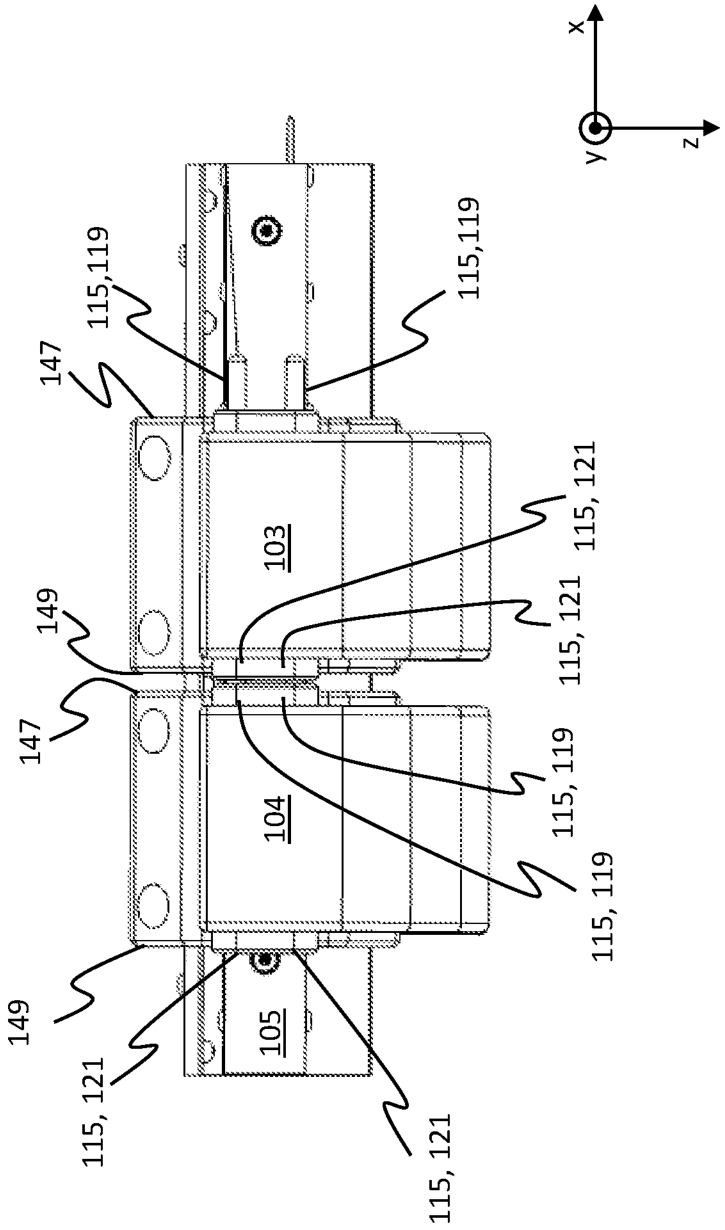

FIGS. 5A and 5B show a schematic top view of the stationary unit 111 and of the two movable units 103, 104 of FIGS. 4A and 4B. In FIGS. 4A and 4B, the applications 137 of the movable units 103, 104 and the controller 133 are shown for the sake of clarity.

According to the embodiment shown in FIGS. 5A and 5B, the movable units 103, 104 each comprise two plug elements 119 arranged next to each other in the second transverse direction z and two corresponding socket elements 121 arranged next to each other in the second transverse direction z. By coupling the two plug elements 119 of the movable unit 103 to the two socket elements 121 of the further movable unit 104, a supply voltage may be provided for the application 137 to be carried out by the movable unit 103. The two plug elements 119 each provide a positive or negative voltage connection. The transmitted voltage may be in the form of a direct voltage or an alternating voltage. The transmitted supply voltage may comprise a load voltage for carrying out the application and a control voltage for providing control of the application. The load voltage and the control voltage may each be transmitted via the two voltage connections.

Figure 6A:
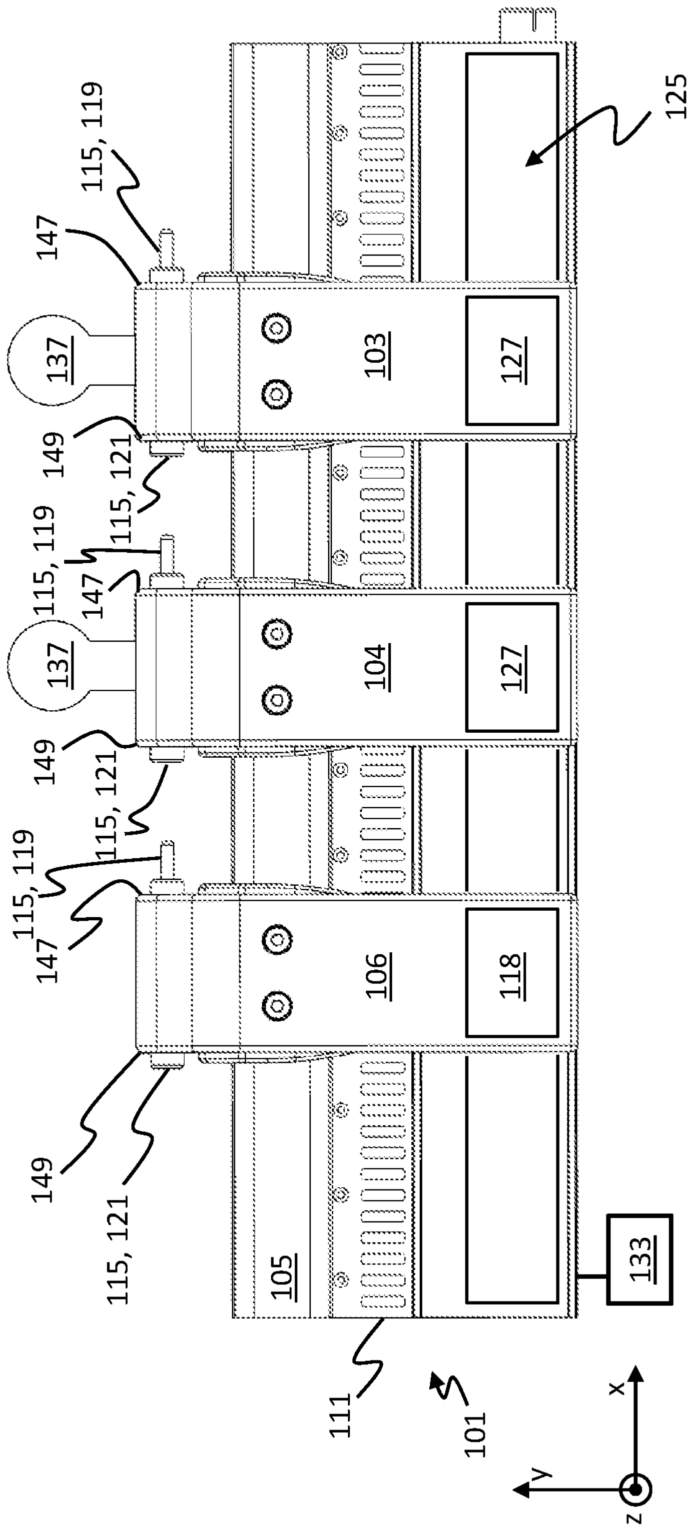
FIGS. 6A and 6B show a stationary unit with three movable units that may be coupled, in an uncoupled and a coupled position.
Figure 6B:
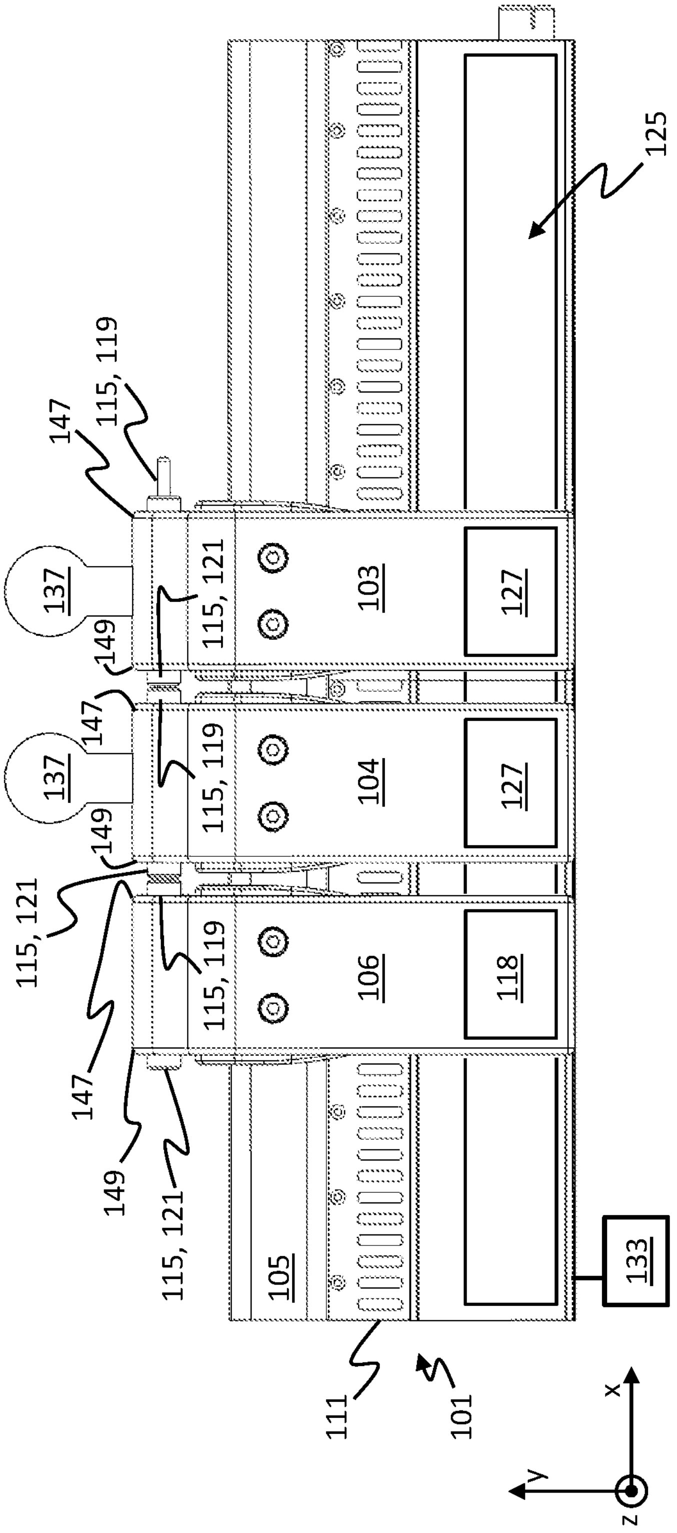

FIGS. 6A and 6B show a schematic depiction of a stationary unit 111 comprising three movable units 103, 104, 106 that may be coupled, in an uncoupled position in FIG. 6A and in a coupled position in FIG. B.

According to a further embodiment of the method according to the application, a coupling of a plurality of movable units 103, 104, 106 may be affected. For this purpose, the controller 133 outputs corresponding control signals to at least one drive coil of the stationary unit 111 in order to position at least a second further movable unit 106 in a second transmission position on the guide rail 105 directly in front of or behind the further movable unit 104 coupled to the movable unit 103, in order to thus affect a coupling of the second further movable unit 106 to the further movable unit 104.

For this purpose, the further movable unit 106 comprises, in analogy to the movable units 103 and 104, corresponding energy-transmitting elements 115 embodied as plug elements 119 and socket elements 121, with the aid of which a coupling with the further movable unit 104 may be affected. In the embodiment shown, the second further movable unit 106 is not embodied with an energy-receiving coil 127 and a corresponding application 137 and serves exclusively to provide an amount of energy to movable units 103, 104 of the linear transport system 101. For this purpose, the second further movable unit 106 comprises a voltage source 118 for providing the energy to be transmitted to the movable units 103, 104. The voltage source 118 can, for example, be embodied as an accumulator.

As an alternative to the embodiments shown in FIGS. 4A and 4B to FIGS. 6A and 6B, the movable units 103, 104, 106 may each be embodied only with plug elements 119 or only with socket elements 121 in such a way that movable units 103, 104, 106 comprise only plug elements 119 and further movable units 103, 104, 106 comprise only socket elements 121. The plug elements 119 may, for example, be embodied at the first ends 147 of the movable units 103, 104, 106, while the socket elements 121 are embodied at the second ends 149 of the further movable units 103, 104, 105. An opposite arrangement, in which the plug elements 119 are formed at the second ends 149 and the socket elements 121 at the first ends 147, is of course possible, as well. A corresponding alternating arrangement of the movable units 103, 104, 106 with plug elements 119 and the movable units 103, 104, 106 with socket elements 121 on the guide rail 105 makes it possible to couple any number of movable units 103, 104, 106 in accordance with the procedure described above.

As an alternative to this, the second further movable unit 106 may be embodied analogously to the movable units 103 and 104 with a corresponding application 137 and corresponding energy-receiving coils 127.

Analogously to the coupling of the further movable unit 104 with the movable unit 103, the second further movable unit 106 is positioned in a second transmission position directly in front of or behind the further movable unit 104 with reference to a direction of travel of the movable units 103, 104, 106. In this context, the second transmission position again only describes a relative position to the further movable unit 104 to be coupled and does not define an absolute position on the guide rail 105.

By controlling the second further movable unit 106 by correspondingly energizing the drive coils of the stationary unit 111 to the second transmission position immediately in front of or behind the further movable unit 104, the coupling of the energy-transmitting elements 115 of the further movable unit 104 and the second further movable unit 106 is affected by the fact that the plug elements 119 of the second further movable unit 106 are inserted into the socket elements 121 of the further movable unit 104 by positioning the second further movable unit 106 immediately in front of or behind the further movable unit 104. In analogy to the above-described, an energy transmission may be affected automatically when the movable units 104, 106 are coupled or by corresponding actuation by the controller 133, in which the controller outputs corresponding control signals to the second further movable unit 106 for providing the required amount of energy.

Any amount of energy may be provided by coupling the plurality of movable units 103, 104, 106. For this purpose, a corresponding amount of energy is transmitted from the second further movable unit 106 to the coupled further movable unit 104. A corresponding amount of energy is transmitted from the further movable unit 104 to the coupled movable unit 103. This may, for example, cover the situation in which the application 137 to be carried out by the movable unit 103 requires an amount of energy which cannot be provided even by the coupling with the further movable unit 104 and the contactless energy transmission via the energy-transmitting coils 125 of the stationary unit 111 and the energy-receiving coil 127 of the movable unit 103. Thus, by coupling the second further movable unit 106 to the further movable unit 104, an additional amount of energy provided by the second further movable unit 106 may be transmitted to the movable unit 103 via the further movable unit 104, so that the amount of energy required to carry out the application 137 of the movable unit 103 may be provided.

By coupling the second further movable unit 106 to the further movable unit 104, it may be achieved additionally or alternatively that the amount of energy required to carry out the application 137 of the further movable unit 104 is provided in addition to the amount of energy required to carry out the application 137 of the movable unit 103. In contrast to the embodiment illustrated in FIGS. 6A and 6B, any number of movable units 103, 104, 106 may be coupled to one another via the described coupling of the energy-transmitting elements 115, wherein an energy transmission of any amount of energy between the coupled movable units 103, 104, 106 is made possible.

Figure 7A:
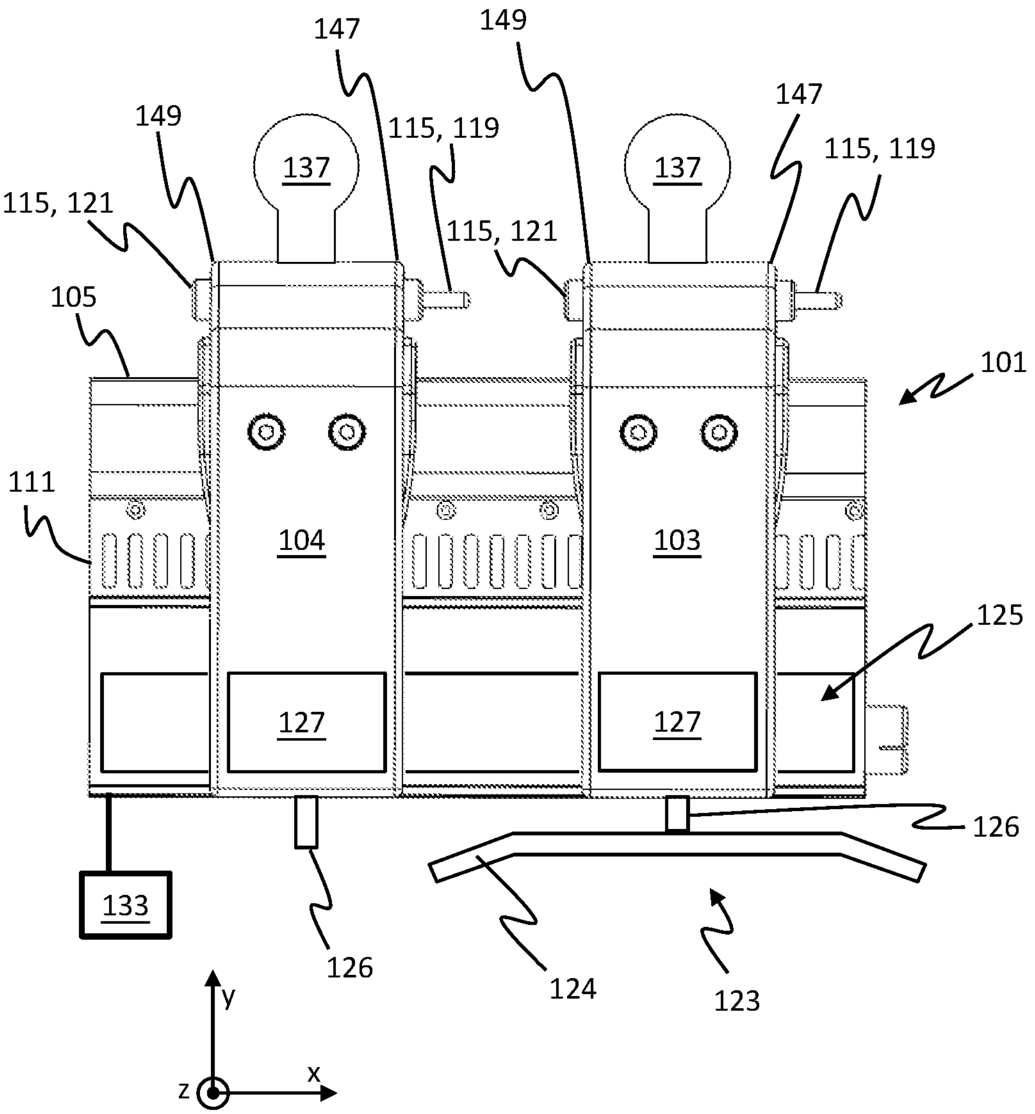
FIGS. 7A and 7B show a stationary unit with two movable units that may be coupled, and an energy supply module.
Figure 7B:
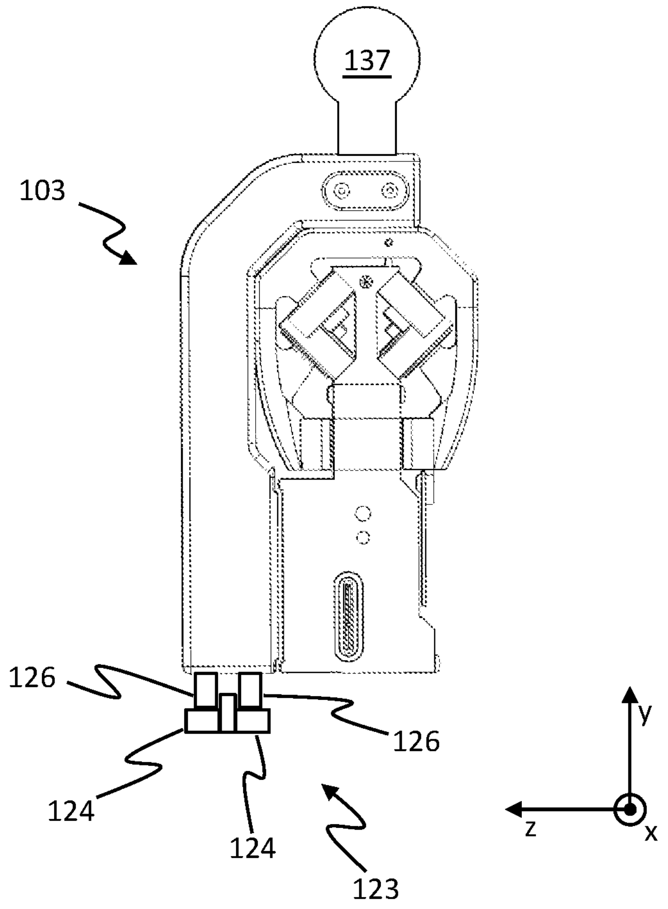

FIGS. 7A and 7B show a schematic depiction of a stationary unit 111 with two movable units 103, 104 that may be coupled, and a power supply module 123.

According to an embodiment, the linear transport system 101 further comprises an energy supply module 123. The energy supply module 123 may be stationarily connected to a stationary unit 111 or positioned next to the stationary unit 111 in the linear transport system 101 and serves to transmit energy to the movable units 103, 104 of the linear transport system 101. For this purpose, the linear movable units 103, 104 comprise an energy tapping element 126, with the aid of which contacting with a contacting element 124 of the energy supply module 123 is allowed for. The energy tapping element 126 may be embodied in such a way that a resilient action of the energy tapping element 126 on the contacting element 124 is possible. For this purpose, the energy gripping element 126 and/or the contacting element 124 may each be arranged resiliently on the movable unit 103, 104 and/or on the energy supply module 123.

In order to supply energy to the movable units 103, 104 via the energy supply module 123, the method according to the application according to an embodiment provides, in a further method step, for the controller 133 to output corresponding control signals to drive coils of the stationary units 111 in order to position the movable unit 103 in an energy transmission position in which the energy transmission module 123 is arranged.

By positioning the movable unit 103 in the energy transmission position, the energy tapping element 126 of the movable unit 103 is brought into contact with the contacting element 124 of the energy supply module 123, thereby allowing for energy to be transmitted from the energy supply module 123 to the movable unit 103.

According to an embodiment, the contacting elements 124 or the energy tapping elements 126 may be embodied as a sliding contact, so that for energy transmission from the energy supply module 123 to the movable unit 103, the movable unit 103 only has to move along the energy supply module 123 in order to thus affect an energy transmission via the contacting elements 124 and energy tapping elements 126 embodied as a sliding contact. However, energy may also be transmitted when the movable unit 103 104 is stationary as long as there is contact between the energy tapping element 126 and the contacting element 124.

For this purpose, the energy supply module 123 may be embodied as a voltage source that is suitable for providing the supply voltage for the application 137 of the movable unit 103. In this context, the amount of energy provided by the energy supply module 123 may comprise the complete amount of energy required to carry out the application 137 of the movable unit 103. Alternatively, the amount of energy provided by the energy supply module 123 may merely represent the differential energy between the amount of energy required to carry out the application 137 and the maximum amount of energy that may be provided by the contactless energy transmission via the energy-transmitting coils 125 and energy-receiving coils 127.

As an alternative to the embodiment presented here, movable units 103, 104 may be embodied with energy storage devices, with the aid of which energy storage of a supply energy for the respective application of the movable unit 103, 104 is made possible directly on the movable unit 103, 104. By contacting the energy tapping element 126 with the contacting element 124 of the energy supply module 123, the energy storage unit of the respective movable unit 103, 104 may be charged. An energy storage device may, for example, be embodied as an accumulator.

As shown in FIG. 7B, the energy supply module 123 may comprise two contacting elements 124 arranged next to each other in a second transverse direction z and the movable unit 103 may correspondingly comprise two energy tapping elements 126 arranged next to each other in the second transverse direction z. A two-pole supply voltage of the application 137 may be provided via the contacting of the two contacting elements 124 with the two energy tapping elements 126. The supply voltage may in turn comprise a load voltage and a control voltage of the application 137, which may each be provided and transmitted via the two contacting elements 124 and energy tapping elements 126 and may each be embodied as a DC or AC voltage.

Figure 8A:
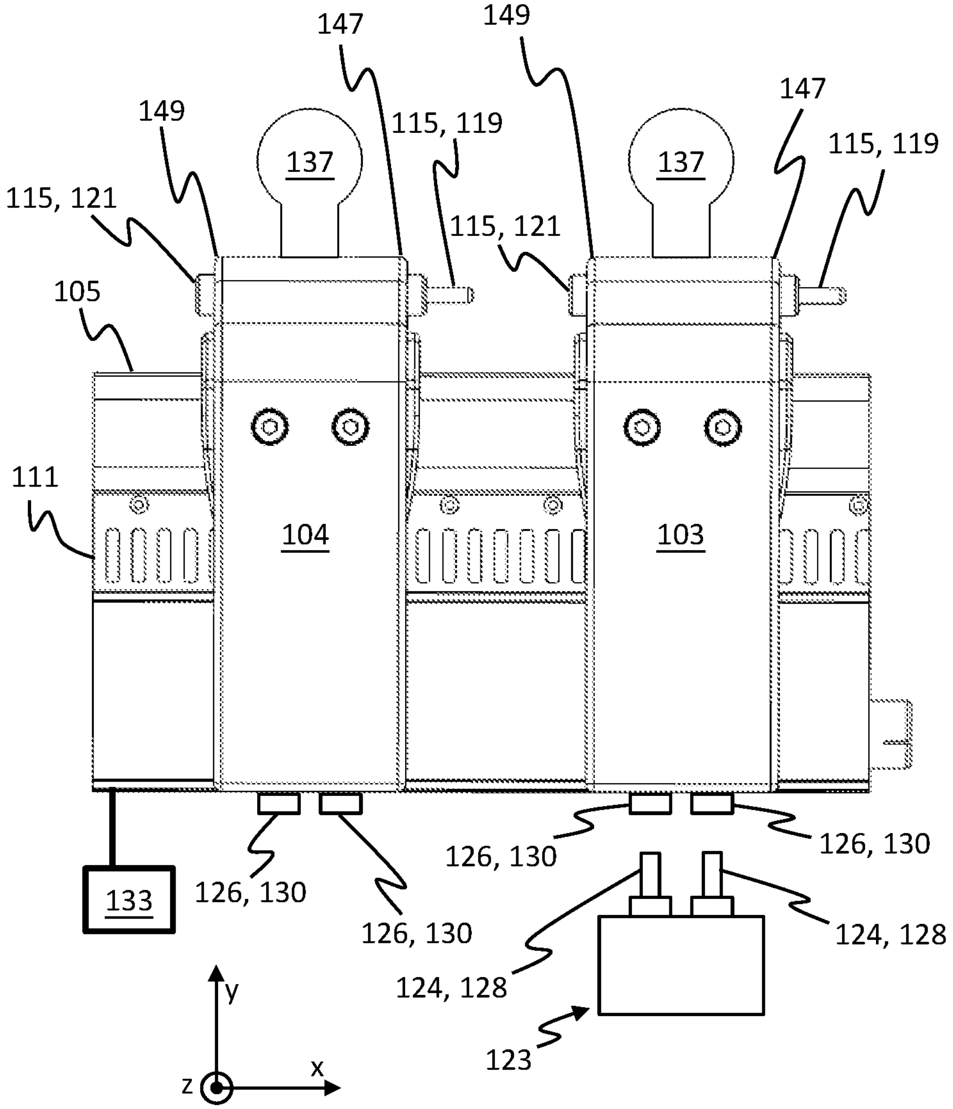
FIGS. 8A and 8B show a stationary unit with two movable units that may be coupled, and a power supply module according to a further embodiment.
Figure 8B:
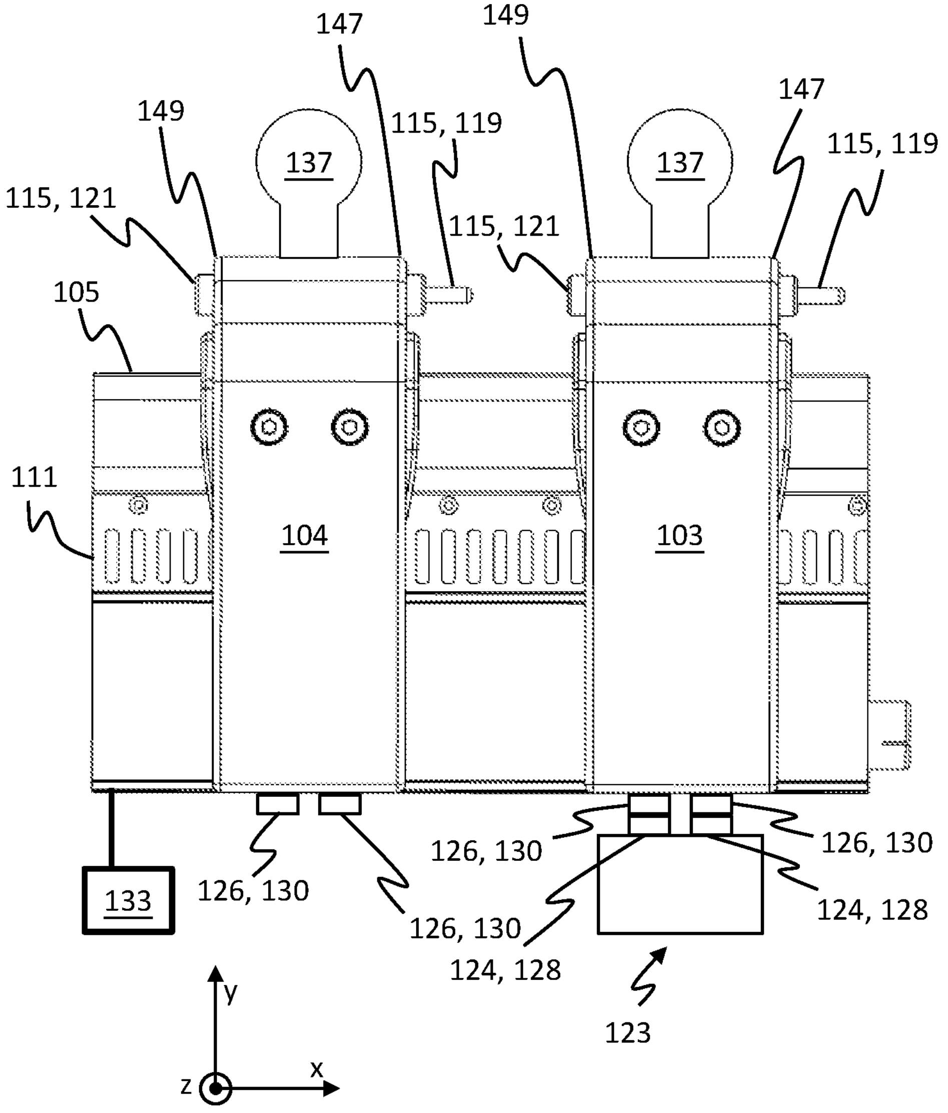

FIGS. 8A and 8B show a schematic depiction of a stationary unit 111 with two movable units 103, 104 that may be coupled, and a power supply module 123 according to a further embodiment.

In the embodiment shown, the energy tapping element 126 of the movable units 103, 104 is embodied as a further socket element 130, while the contacting element 124 of the energy supply module 123 is embodied as a further plug element 128. Contact may be made by inserting the plug element 128 into the socket element 130. For contacting the energy tapping element 126 of the movable units 103, 104 and the contacting element 124, the energy supply module 123 may be moved along the first transverse direction y towards the movable units 103, 104 by a corresponding mechanism in order to thus affect an insertion of the further plug elements 128 into the further socket elements 130.

In analogy to the embodiment of FIGS. 7A and 7B, the energy supply module 123 comprises two contacting elements 124 in each case, while the movable units 103, 104 comprise two energy tapping elements 126. In turn, a load voltage and a control voltage of the application 137 may be provided via a contacting, wherein the two contacting elements 124 each represent a positive or negative pole of the supply voltage.

The energy supply module 123 may be embodied to be stationary on a stationary unit 111. The energy supply module 123 may also be embodied independently of the stationary unit 111. Alternatively, the energy supply module 123 may be embodied to be movable along the guide rail 105 and may be moved, for example, via a further guide rail. In particular, the energy supply module 123 may comprise a guide running along the first transverse direction y, with the aid of which the energy supply module 123 may be moved towards or away from the movable unit 103, 104.

As an alternative to the embodiments of FIGS. 7A and 7B and FIGS. 8A and 8B, the movable unit 103 may be embodied without energy-transmitting elements 115 and only with energy tapping elements 126. In this case, energy is transmitted from the stationary unit 111 to the movable unit 103 for carrying out the application 137 exclusively via the contactless energy transmission with the aid of the energy-transmitting coils 125 of the stationary unit 111 and/or via the energy transmission with the aid of the energy transmission module 123. Depending on the amount of energy required, the energy transmission may take place exclusively as contactless energy transmission with the aid of the energy transmitting and energy-receiving coils 125, 127 or exclusively as energy transmission via the energy transmission module 123 or as a combination of the two energy transmission modes.

Figure 9:
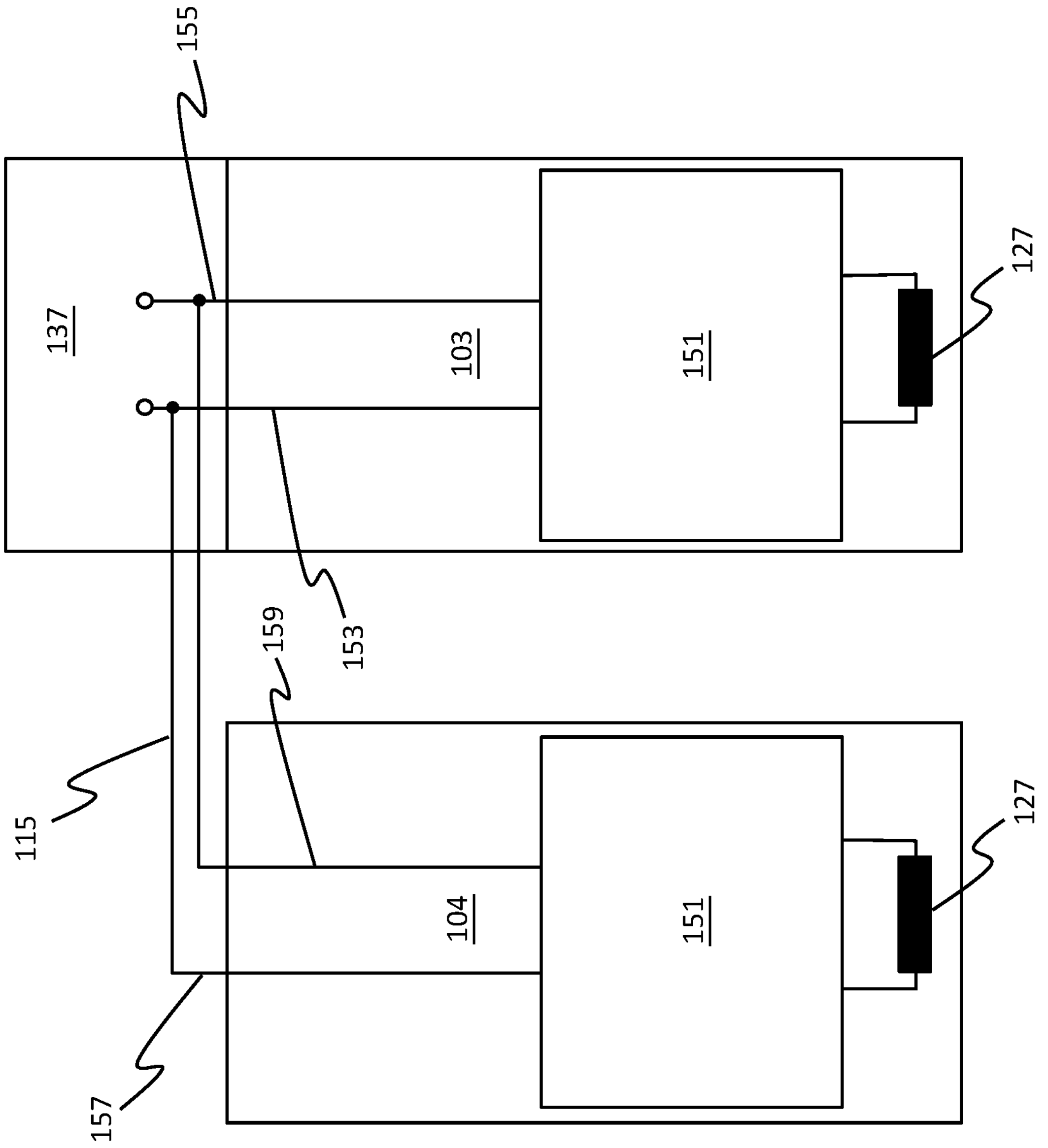
FIG. 9 shows a circuit diagram of a coupling of two movable units.

FIG. 9 shows a circuit diagram of a coupling of two movable units 103, 104.

According to the embodiment shown, the circuit-based energy supply of the application 137 of the movable unit 103 comprises a first circuit path 153 and a second circuit path 155 for providing the supply voltage of the application 137. The first and second circuit paths 153, 155 are each connected to the energy-receiving coil 127 and thus allow for transmitting the supply voltage provided by the energy-receiving coil 127 to the application 137. The supply voltage may comprise a load voltage and a control voltage of the application 137.

The first and second circuit paths 153, 155 each provide a positive or negative pole of the supply voltage. In the first and second circuit paths 153, 155, a rectifying element 151 is arranged between the application 137 and the energy-receiving coil 127. The rectifying element 151 may be used to convert an AC voltage provided by the energy-receiving coil 127 into a DC voltage or a pulsed DC voltage. The rectifying element 151, which is arranged upstream of a coupling point of the two movable units 103, 104 as viewed from the energy-receiving coil 127, may also prevent cross currents or reverse currents between the two coupled movable units 103, 104.

Furthermore, by coupling the movable unit 103 with the further movable unit 104 via the energy-transmitting elements 115, a third circuit path 157 and a fourth circuit path 159 are embodied for providing the supply voltage. The third circuit path 157 is coupled to the first circuit path 153, while the fourth circuit path 159 is coupled to the second circuit path 155. In analogy to the first and second circuit paths 153, 155, the third and fourth circuit paths 157, 159 provide a positive and a negative pole of the supply voltage. In analogy to the movable unit 103, the further movable unit 104 between the energy-receiving coil 127 and the application 137 also comprises a rectifying element 151 integrated into the third and fourth circuit paths 157 159, with the aid of which an AC voltage provided by the energy-receiving coil 127 may be converted into a DC voltage or pulsed DC voltage.

Figure 10:
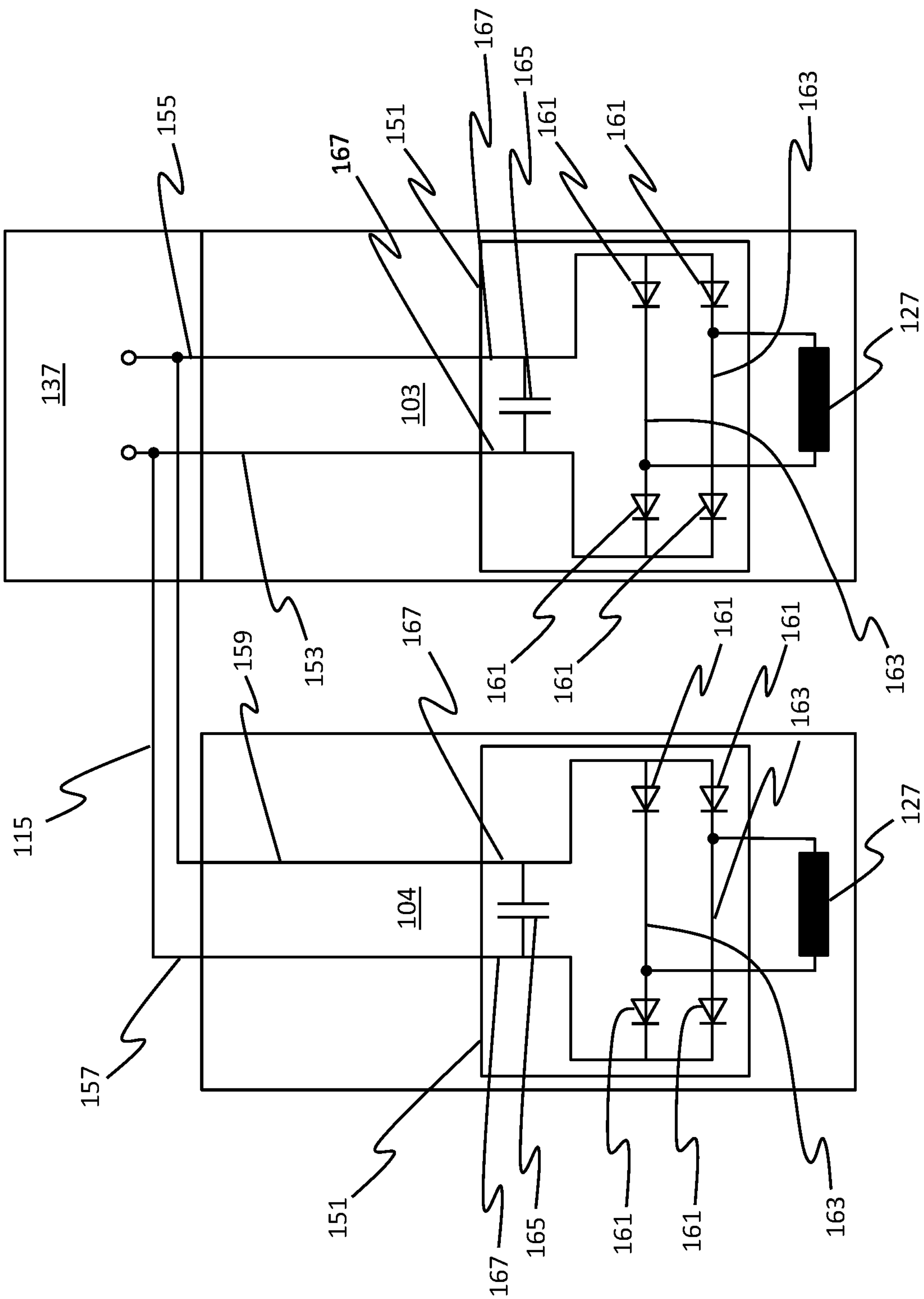
FIG. 10 shows a further circuit diagram of a coupling of two movable units.

FIG. 10 shows a further circuit diagram of a coupling of two movable units 103, 104.

The embodiment shown in FIG. 10 is based on the embodiment of FIG. 9 and includes all the features shown there. A further detailed description is therefore dispensed with below.

In the shown embodiment, the rectifier elements 151 of the two coupled movable units 103, 104 are each embodied as a bridge circuit. In this case, the bridge circuits each comprise four diode elements 161, which are each arranged in pairs in two parallel circuit paths 163 of the bridge circuit.

The two parallel circuit paths 163 are each connected to the energy-receiving coil 127 of the movable unit 103, 104. In this context, the energy-receiving coil 127 is connected in both parallel circuit paths 163 between the two diode elements 161 of a parallel circuit path 163. An AC voltage provided by the energy-receiving coil 127 may be converted into a pulsed DC voltage via the four diode elements 161, which are each connected in the same direction. For further smoothing of the pulsed DC voltage, the bridge circuits each further comprise a capacitor element 165. The capacitor element 165 is arranged behind the two parallel circuit paths 163 as seen from the energy-receiving coils and is connected between two connection paths 167, which each connect the two parallel circuit paths 163 to the first and second circuit paths 153, 155 and the third and fourth circuit paths 155, 157.

In addition to the solutions described above, in order to increase the maximum amount of energy to be transmitted via the contactless energy transmission between the energy-transmitting coils 125 of the stationary units 111 and the energy-receiving coils 127 of the movable unit 103, it may further be provided to reduce a distance between the energy-transmitting coil 125 of the stationary unit 111 and the energy-receiving coil 127 of the movable unit 103. For this purpose, an actuator that may be controlled by the controller 103 may be controlled to exert a compressive force directed in the first transverse direction z on the movable unit 103 in order to thus press the energy-receiving coil 127 closer to the energy-transmitting coil 125 of the stationary unit 111. By reducing the distance between the energy transmitting and receiving coils 125, 127, the amount of energy that may be provided via the contactless energy transmission may be increased.

The application further provides the controller 133, which is arranged to carry out the described method and to output control signals corresponding to the method in order to move the movable units 103, 104, 106 along the guide rail by controlling the drive coils of the stationary units 111 and to couple them to one another via the respective energy-transmitting elements 115, and/or to control energy-transmitting coils 125 of the stationary units 111 in order to transmit energy from the energy-transmitting coils 125 to the energy-receiving coils 127 of the movable units 103, 104.

The controller 133 may further be arranged to recognize, based on the respective application to be carried out by the movable unit, that the amount of energy transmissible via the energy-transmitting coils 125 of the stationary units 111 and the energy-receiving coils 127 of the movable unit 103 is not sufficient to carry out the application. Based on this, the controller 133 may be configured to cause the actuation of at least one further movable unit 104 for coupling to the movable unit 103 via the energy-transmitting elements 115. The controller 133 may further be embodied to receive a signal message from the movable unit 103, in which the movable unit 103 signals that the amount of energy that may be transmitted via the energy-transmitting coils 125 of the stationary units 111 and the energy-receiving coils 127 of the movable unit 103 is not sufficient to carry out the application.

Based on this, the controller 133 may actuate at least one further movable unit 104 for coupling with the movable unit 103. The controller 133 may further be arranged to control the movable unit 103 to assume an energy transmission position on the guide rail 105, in which an energy transmission module 123 with a contacting element 124 is arranged and to initiate an energy transmission from the energy transmission module 123 to the movable unit 103 by contacting an energy tapping element 126 of the movable unit 103.

The application further provides a computer program comprising program code which, when carried out on a computer, causes the computer to carry out the method for transmitting energy from a stationary unit 111 of a linear transport system 101 to a movable unit 103 of the linear transport system 101. Such a computer program may, for example, be stored within the controller 133. Further, the application comprises a machine-readable storage medium comprising the computer program.

The application also provides a movable unit 103, 104, 106 of the linear transport system 101. The movable unit 103, 104, 106 comprises a rotor 113 with one or a plurality of magnets 117, with the aid of which the movable unit 103, 104, 106 may be driven along the guide rail 105 of the stationary units 111 via a magnetic coupling with a stator magnetic field of the drive coils of the stationary units 111 of the linear transport system 101. The movable unit 103, 104, 106 further comprises at least one energy-transmitting element 115, with the aid of which a coupling with at least one energy-transmitting element 115 of a further movable unit 104, 106 is allowed for. By coupling energy-transmitting elements 115 of a plurality of movable units 103, 104, 106, an energy transmission between the movable units 103, 104, 106 may be achieved.

According to an embodiment, the energy-transmitting element 115 is embodied as a plug connection and comprises a plug element 119 and/or a socket element 121. According to an embodiment, the plug element 119 may be embodied at a first end 147 and the socket element 121 may be embodied at a second end 149 of the movable unit 103, 104, 106 arranged opposite to the first end. Each movable unit 103, 104, 106 may thus be coupled directly to at least two further movable units 104, 106. According to an embodiment, the plug element 119 and/or the socket element 121 may be spring-mounted in a longitudinal direction x of the plug element 119 and/or the socket element 121.

According to an embodiment, the plug element 119 may furthermore be elastically deformable in a transverse direction y, z of the plug element 119. The plug element 119 may, for example, comprise a cable element. According to an embodiment, the energy-transmitting elements 115 may be embodied as conductive contact elements instead of plug and socket elements 119, 121, wherein a coupling of movable units 103, 104, 106 may be realized by contacting the contact elements. According to an embodiment, an application electronics of an application 137 of the movable unit 103, 104 may be connected to an energy-transmitting element 115 via a coupling circuit.

The coupling circuit may be used to ensure that when energy-transmitting elements 115 of a movable unit 103 comprising application 137 and a further movable unit 104 are coupled, the amount of energy required to carry out the application is automatically transmitted from the further movable unit 104 to the application electronics of the application 137 of the movable unit 103. The coupling circuit may further comprise at least one rectifying element 151 via which cross currents between the coupled movable units 103, 104, 106 may be prevented.

According to an embodiment, the movable unit 103, 104 may further comprise an energy tapping element 126 for contacting with a contacting element 124 of an energy supply module 123 of a stationary unit 111 of the linear transport system 101. By contacting the energy tapping element 126 with the contacting element 124, energy may be transmitted from the energy transmission module 123 to the movable unit 103, 104. The energy transmission module 123 may be a stationary voltage source arranged on a stationary unit 111 of the linear transport system 101.

The application further provides a linear transport system 101 having a controller 133 according to the application, a plurality of movable units 103, 104, 106 according to the application in line with one of the above embodiments and a stationary unit 111 having a stator 109 comprising one or a plurality of drive coils for driving a rotor 113 of a movable unit 103, 104, 106 along a guide rail 105 of the stationary unit 111. The stationary unit 111 in this context comprises at least one energy-transmitting coil 125 for transmitting energy to energy-receiving coils 127 of the movable units 103, 104, 106. The stator 109 of the stationary unit 111 and the rotors 113 of the movable units 103, 104, 106 form a linear drive.

According to an embodiment, the stationary unit 111 comprises an energy supply module 123 having a contacting element 124, with the aid of which an energy transmission from the stationary unit 111 to the movable unit 103, 104, 106 may be affected via contacting with an energy tapping element 126 of a movable unit 103, 104, 106. The energy supply module 123 may in this context be embodied as a stationary voltage source, which is arranged in a stationary manner at a fixed position in the linear transport system 101. Alternatively, the energy supply module 123 may be embodied as a movable voltage source that may be moved between different positions along a predetermined path within the linear transport system 101.

The linear transport system 101 may for example be used in automation technology. The applications 137 arranged on the movable unit 103 or the further movable unit 104 may comprise, for example, grippers, pushers, drills, alignment devices, measuring tools for measuring physical variables such as temperature, pressure, current, voltage, acceleration, mass, incidence of light, controllers for controlling processes, pump devices or fan units. Furthermore, the applications 137 may each comprise a read head with the aid of which an encoder tape may be read out, thus allowing for determining a further position. This furthermore precise position may then also be used for improved control of the movable unit 103 and/or actuation of the linear motor 107.

This principle may of course also be used with other physical variables measured on the movable units 103, for example accelerations or vibrations. In addition, physical variables may be generated on the movable units 103, 104 with the aid of the applications 137. A force could be generated via a movement of the application 137 of the movable units 103, 104 and the force could also be controlled or adjusted with an adjustable current limit of the drive coil of the application 137 used. Furthermore, a vacuum could be generated. This would allow products to be picked up and released via a special suction cup in a way that is particularly gentle on the product itself. Test voltages could be generated. Using such test voltages, it would also be possible to functionally test products consisting of more complex electronic circuits.

Communication to a more complex product having a communication interface would also be possible. Other physical variables may also be generated for material testing, for example ultrasound, currents or light. Communication may also be established with a workpiece transported by the movable units 103, 104 and thus tests or other production monitoring may take place, for example seamless product tracking, if this data is linked with other data in the controller 133 and written to a database, for example. In this way, data and/or program code may be advantageously written to or read from a workpiece.

Furthermore, a heater could be provided to generate a higher temperature in a targeted and limited manner in a small area in order to dry an adhesive or paint faster and more energy-efficiently during a process, for example. Provision may be made to keep workpieces or products on the movable units 103, 104 at a certain temperature, for example in order to be able to process the workpieces or products for longer. The energy required for heating may be provided via the contactless energy transmission and/or the coupling of the movable units 103, 104.

Furthermore, the movable unit 103, 104 may each comprise a camera or other sensors to inspect the linear transport system 101 and/or an object to be transported on the movable unit 103, 104 for wear, dirt or other. This is particularly useful if the linear transport system 101 comprises areas that are difficult or impossible to access.

In this context, movements of any kind may be carried out on the movable units 103, 104, for example also transverse to the direction of travel defined by the guide rail 105. Grippers on the movable units 103, 104 may grip and release products virtually autonomously without the need for a mechanical gate with springs. Depending on the status of the products, it may also be possible to place them on a different belt and sort them out, for example. The applications 137 may comprise pushers in order to push products from a movable unit 103, 104 onto a belt, for example. The pushers or similar movable elements on the movable unit 103, 104 may be used to distribute a product flow, which is handled via a linear transport system 101, to various further transports such as belts. Thus, with just one linear transport system 101 without a diverter (with the aid of which the movable units 103 could be guided in different directions), it is possible to divide up a fast product flow as required and also bring it back together again in the opposite direction.

The applications 137 may be used to carry out movements with the aid of which products may be manipulated, for example to erect a box or process products. Drills may be used or pressure may be exerted on the products using a press. Furthermore, rotary movements may be carried out to change the orientation of products from longitudinal to transverse, for example by rotating a workpiece holder. Products may be lifted. Products may be rotated and thus, for example, a bottle cap may be screwed on. The distance between products may also be changed. Actuators on the movable units 103, 104 may be used to move products so that product misalignments on an empty movable unit 103 may be compensated for. Thus, in a row of movable units 103, 104 with a product defect in the row, the products on the units to the left of it may be moved half the distance to the right and vice versa on the other side, so that the products may be removed from a subsequent machine unit for further processing at an equal distance from one another without a defect in between.

Products such as bottles may be precisely aligned if, for example, a label, print or other component such as a drinking straw is to be applied to a bottle. Movements may be superimposed. Various hardware may be integrated into the applications 137 of the movable units 103, 104 and may be controlled via set values, for example also via PWM signals (solenoid valves, DC motor, stepper, small servo, voice coil motor, vibration elements, electromagnets, vacuum, laser, ultrasonic source). Absolute positioning may also be achieved without feedback using hardware limit switches or movements against a stop, for example in a DC motor. A position of a motorized axis or an object to be transported may also be detected via an inductive proximity switch or an optically detectable marking, which in turn allows the motor to be referenced absolutely. Products may be measured via grippers or other mechanics and a measurement of the current consumption during movement (condition monitoring of components of the movable units 103, 104 as well as product components is also possible). Products may be sorted and, for example, transmitted between movable units 103 and depositing stations.

An electrically operated tool change on the movable units 103, 104 is possible, as well. Tools/holders/brackets may be intelligently adapted to the dimensions of the product.

The controller 133 may be used to control the amount of energy to be transmitted via the contactless energy transmission with the aid of the energy-transmitting coils 125 of the stationary units 111 and the energy-receiving coils 127 of the movable units 103, 104, in particular also the frequency and amplitude of the energy transmission. The amount of energy to be transmitted may be different for each movable unit 103, 104. A position of the movable unit and the applicative object of the movable unit 103 at its position may be known to the controller 133, so that in areas in which little (applicative) energy is required, for example for certain actions on the movable unit 103, a primary coil current of the energy transmission coil 125 may be adapted in frequency, amplitude, but also signal form (for example sine or triangle), so that less (or more) energy may be transmitted.

In an advantageous manner, the movable unit 103 may also transmit information about an energy state of the movable unit 103 with the aid of data communication taking place via the stationary antenna 129 and movable antenna 131, so that the primary coil current may be set accordingly optimally and overall in as loss-free a manner as possible or may be controlled via the communication feedback. Thus, for example, it may also be prevented that superfluous energy is consumed on the movable unit 103, 104 and, for example, has to be converted into heat loss in the event of a (constantly set) excessively high energy transmission, in particular at positions or in situations in which not so much energy is required on the movable unit 103. Furthermore, consumers may be present on the movable units 103, 104, which may dissipate too much transmitted energy if too much energy is transmitted to the movable units 103, 104, for example due to fluctuations in the air gap or different coil overlaps, so that no overvoltages can occur on the movable unit 103. Such loads may be, for example, varistors or power resistors with corresponding electronic circuitry.

For all of the applications mentioned, both the energy transmission according to the application and a data transmission between the stationary unit 111 and the movable units 103, 104 may be required.

This invention has been described with respect to exemplary examples. It is understood that changes can be made and equivalents can be substituted to adapt these disclosures to different materials and situations, while remaining with the scope of the invention. The invention is thus not limited to the particular examples that are disclosed, but encompasses all the examples that fall within the scope of the claims.

TABLE 1

| List of reference numerals |
|---|
| 101 transport system |
| 103 movable unit |
| 104 further movable unit |
| 105 guide rail |
| 106 second further movable unit |
| 107 linear motor |
| 109 stator |
| 111 stationary unit |
| 113 rotor |
| 115 energy-transmitting element |
| 117 magnet |
| 118 voltage source |
| 119 plug-in element |
| 121 socket element |
| 123 energy supply module |
| 124 contacting element |
| 125 energy-transmitting coil |
| 126 energy tapping element |
| 127 energy-receiving coil |
| 128 further plug element |
| 129 stationary antenna |
| 130 further socket element |
| 131 movable antenna |
| 133 controller |
| 137 application |
| 139 roller |
| 141 rolling surface |
| 143 position-detecting element |
| 145 position sensor |
| 147 first end |
| 149 second end |
| 151 rectifying element |
| 153 first switching path |
| 155 second switching path |
| 157 third switching path |
| 159 fourth switching path |
| 161 diode element |
| 163 circuit path |
| 165 capacitor element |
| 167 connection path |
| X longitudinal direction |
| Y first transverse direction |
| Z second transverse direction |

The invention claimed is:

1. A method for transmitting energy from a stationary unit of a linear transport system to a movable unit of the linear transport system, wherein the linear transport system comprises the movable unit and at least one further movable unit, a guide rail for guiding the movable units, a plurality of such stationary units and a linear motor for driving the movable units along the guide rail, wherein the linear motor comprises a stator and a plurality of rotors, wherein the stator comprises the stationary units, which each comprise one or a plurality of drive coils, wherein the rotors are arranged at the movable units and each comprise one or a plurality of magnets, wherein the movable units are actuatable along the guide rail by energizing the drive coils and magnetic coupling with magnets of the movable units, the stationary units each comprising one or a plurality of energy-transmitting coils, the movable unit comprising at least one energy-receiving coil, energy being transmissible to the at least one energy-receiving coil of the movable unit by energizing the energy-transmitting coils of the stationary units, wherein the movable unit and the further movable unit each comprise energy-transmitting elements, wherein an energy transmission from the further movable unit to the movable unit is responsive to a coupling of the energy-transmitting elements of the movable unit and the further movable unit; and wherein the linear transport system comprises a controller, wherein the following steps are carried out by the controller:

determining that the movable unit requires an amount of energy to carry out an application that cannot be provided via an energy transmission between the one or plurality of energy-transmitting coils of at least one of the stationary units and the at least one energy-receiving coil of the movable unit; and outputting control signals to at least one of the stationary units for positioning the further movable unit in a transmission position on the guide rail in front of or behind the movable unit and for the coupling of the energy-transmitting elements of the movable unit and the further movable unit.

2. The method according to claim 1, wherein the further movable unit comprises at least one energy-receiving coil, and wherein the controller further carries out the following step:

outputting control signals to at least one of the stationary units for energizing at least one of the energy-transmitting coils and for transmitting an amount of energy from the at least one energy-transmitting coil to the at least one energy-receiving coil of the further movable unit positioned in the transmission position.

3. The method according to claim 1, wherein the controller determines, based on the application to be carried out by the movable unit and the amount of energy required to carry out the application, that the amount of energy required to carry out the application cannot be provided via the energy transmission between the one or plurality of energy-transmitting coils of at least one of the stationary units and the at least one energy-receiving coil of the movable unit.

4. The method according to claim 3, wherein the controller further carries out the following step:

receiving a signal message of the movable unit, wherein the signal message of the movable unit signals to the controller that the amount of energy required to carry out the application is not provided.

5. The method according to claim 1, wherein the linear transport system comprises at least a second further movable unit, wherein the second further movable unit comprises at least one energy-transmitting element, and wherein the controller further carries out the following step:

determining that an amount of energy transmissible from the further movable unit to the movable unit is not sufficient to provide the amount of energy required to carry out the application;

outputting control signals to at least one of the stationary units for positioning the second further movable unit in a second transmission position in front of or behind the further movable unit and for coupling the energy-transmitting elements of the second further movable unit and the further movable unit.

6. The method according to claim 1, wherein coupling of the further movable unit and the movable unit is carried out via the respective energy-transmitting elements during a movement of the movable unit and the further movable unit along the guide rail.

7. The method according to claim 1, wherein the linear transport system comprises an energy supply module, wherein the energy supply module is arranged at an energy supply position along the guide rail, wherein the movable unit comprises an energy tapping element, and wherein the controller further carries out the following step:

outputting of control signals for actuating the movable unit into the energy supply position on the guide rail and for contacting a contacting element of the energy supply module with the energy tapping element, wherein an energy transmission from the energy transmission module to the movable unit is responsive to contacting the energy tapping element with the contacting element.

8. A controller for a linear transport system, wherein:

the linear transport system comprises the movable unit and at least one further movable unit, a guide rail for guiding the movable units, a plurality of such stationary units and a linear motor for driving the movable units along the guide rail, the linear motor comprises a stator and a plurality of rotors, wherein the stator comprises the stationary units, which each comprise one or a plurality of drive coils, the rotors are arranged at the movable units and each comprise one or a plurality of magnets, wherein the movable units are actuatable along the guide rail by energizing the drive coils and magnetic coupling with magnets of the movable units, the stationary units each comprising one or a plurality of energy-transmitting coils, the movable unit comprising at least one energy-receiving coil, energy being transmissible to the at least one energy-receiving coil of the movable unit by energizing the energy-transmitting coils of the stationary units, wherein the movable unit and the further movable unit each comprise energy-transmitting elements, wherein an energy transmission from the further movable unit to the movable unit is responsive to a coupling of the energy-transmitting elements of the further movable unit and the movable unit; and wherein the linear transport system comprises a controller, the controller comprising a computer processor and memory configured for:

determining that the movable unit requires an amount of energy to carry out an application that cannot be provided via an energy transmission between the one or plurality of energy-transmitting coils of at least one of the stationary units and the at least one energy-receiving coil of the movable unit; and outputting control signals to at least one of the stationary units for positioning the further movable unit in a transmission position on the guide rail in front of or behind the movable unit and for the coupling of the energy-transmitting elements of the further movable unit and the movable unit.

9. A non-transitory machine-readable data storage medium with computer program code stored thereon, the computer program code executable on a computer processor to perform the method according to claim 1.

10. A movable unit for a linear transport system, wherein the movable unit comprises a rotor having one or a plurality of magnets, wherein the movable unit is drivable by drive coils of stationary units of the linear transport system along a guide rail of the stationary units via the rotor, wherein the movable unit comprises an energy-receiving coil for energy transmission from a stationary unit of the linear transport system to the at least one energy-receiving coil of the movable unit, and wherein the movable unit comprises at least one energy-transmitting element;

wherein the movable unit comprises a coupling circuit connected to the energy-receiving coil and the energy-transmitting element and/or an application of the movable unit, wherein the coupling circuit comprises two circuit paths and a rectifying element, and wherein the two circuit paths provide a positive and a negative pole of a supply voltage provided by the energy-receiving coil, wherein the supply voltage is adapted to comprise a load voltage and a control voltage of the application, wherein the at least one energy-transmitting element is couplable to an energy-transmitting element of a further movable unit, and wherein an energy transmission between the movable units is responsive to a coupling of the respective energy-transmitting elements.

11. The movable unit according to claim 10, wherein the at least one energy-transmitting element is configured as a plug connection and comprises a plug element and/or a socket element.

12. The movable unit according to claim 11, wherein the plug element is configured at a first end and the socket element is configured at a second end of the movable unit arranged opposite to the first end.

13. The movable unit according to claim 11, wherein the plug element and/or the socket element are spring-mounted in a longitudinal direction and/or a transverse direction of the plug element and/or of the socket element.

14. The movable unit according to claim 11, wherein the plug element is elastically deformable or spring-mounted in a transverse direction of the plug element.

15. The movable unit according to claim 10, wherein the movable unit comprises an application for carrying out a process, and wherein the coupling circuit comprises at least one rectifying element preventing a current flow from the application electronics into the at least one energy-transmitting element.

16. The movable unit according to claim 11, wherein the movable unit comprises an energy tapping element for contacting a contacting element of an energy supply module of at least one of the stationary units of the linear transport system, wherein an energy transmission from the energy transmission module to the movable unit is responsive to a contacting of the energy tapping element with the contacting element.

17. A linear transport system comprising:

a plurality of movable units, wherein each movable unit comprises a rotor having one or a plurality of magnets, wherein each movable unit is drivable by drive coils of stationary units of the linear transport system along a guide rail of the stationary units via the rotor, wherein each movable unit comprises at least one energy-transmitting element, wherein the at least one energy-transmitting element is couplable to an energy-transmitting element of a further movable unit, and wherein an energy transmission between the movable units is responsive to a coupling of the respective energy-transmitting elements; and the stationary units comprising a stator having one or a plurality of the drive coils for driving the rotors of the movable units along a guide rail of the stationary units, wherein at least one of the stationary units comprises at least one energy-transmitting coil and at least one of the movable units comprises at least one energy-receiving coil for transmitting energy between the at least one stationary unit and the at least one movable unit, and wherein the stator of the stationary units and the rotors of the movable units form a linear drive; and a controller configured for transmitting the energy from the stationary unit to the movable unit of the linear transport system, wherein the contoller comprises a computer processor system and memory configured for:

determining that the movable unit requires an amount of energy that cannot be provided via energy transmission between energy-transmitting coils of at least one of the stationary units and the at least one energy-receiving coil of the movable unit; and outputting control signals to at least one of the stationary units for positioning the further movable unit in a transmission position on the guide rail in front of or behind the movable unit, and for coupling the energy-transmitting elements of the further movable unit and the movable unit.

18. The linear transport system according to claim 17, wherein at least one of the stationary units comprises an energy supply module with a contacting element, and wherein an energy transmission from the at least one stationary unit to at least one of the movable units is responsive to a contacting between an energy tapping element of the at least one movable unit with the contacting element of the energy supply module.

* * * * *